United States Patent
Zhang et al.

(10) Patent No.: US 9,590,223 B2
(45) Date of Patent: Mar. 7, 2017

(54) BATTERY CELL CONNECTOR

(71) Applicants: Zhonglin Zhang, Shenzhen (CN); Xiumei Xie, Shenzhen (CN); Yanfei Zhou, Shenzhen (CN)

(72) Inventors: Zhonglin Zhang, Shenzhen (CN); Xiumei Xie, Shenzhen (CN); Yanfei Zhou, Shenzhen (CN)

(73) Assignee: BYD COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/871,739

(22) Filed: Sep. 30, 2015

(65) Prior Publication Data

US 2016/0329545 A1    Nov. 10, 2016

(30) Foreign Application Priority Data

May 8, 2015    (CN) .......................... 2015 1 0233602
May 8, 2015    (CN) .......................... 2015 1 0234575

(51) Int. Cl.
| | |
|---|---|
| *H01R 3/00* | (2006.01) |
| *H01M 2/20* | (2006.01) |
| *H01R 13/533* | (2006.01) |
| *H01R 4/30* | (2006.01) |

(52) U.S. Cl.
CPC .............. *H01M 2/206* (2013.01); *H01R 4/30* (2013.01); *H01R 13/533* (2013.01)

(58) Field of Classification Search
CPC ........ H01M 2/206; H01R 13/533; H01R 4/30
USPC ........................................ 439/382, 500, 862
See application file for complete search history.

(56) References Cited

U.S. PATENT DOCUMENTS

| | | | | |
|---|---|---|---|---|
| 6,875,049 B2* | 4/2005 | Kyowski | .............. | H01R 11/282 439/500 |
| 7,270,576 B2* | 9/2007 | Kim | ...................... | H01M 2/206 429/158 |
| 7,390,229 B2* | 6/2008 | Huang | ................. | H01R 11/282 439/862 |
| 8,246,379 B1* | 8/2012 | Zhang | ................... | H01M 2/204 439/500 |

OTHER PUBLICATIONS

Zhang, Office Action, U.S. Appl. No. 14/871,712, Jul. 6, 2016, 10 pgs.

* cited by examiner

*Primary Examiner* — Javaid Nasri
(74) *Attorney, Agent, or Firm* — Morgan, Lewis & Bockius LLP

(57) ABSTRACT

A battery cell connector includes a plurality of segments of a metal conducting sheet. Each segment defines a plane and having a longitudinal axis. The battery cell connector further includes plurality of bends coupling the segments together into a 3-D object. Each bend is located between a pair of adjacent segments of the plurality of segments and the pair of adjacent segments defines two distinct respective planes. The battery cell connector further includes at least one spring comprising two segments welded together. A first segment of the plurality of segments includes first connecting elements for a battery pole of a first battery cell. A second segment of the plurality of segments includes second connecting elements for a battery pole of a second battery cell. The first connecting elements are electrically coupled with the second connecting elements.

17 Claims, 27 Drawing Sheets

BATTERY CELL CONNECTOR

RELATED APPLICATIONS

This application claims priority to Chinese Patent No. 201510233602.6, entitled "POWER BATTERY CELL CONNECTOR, POWER BATTERY MODULES, POWER BATTERY PACKAGES, AND CAR," filed on May 8, 2015, and Chinese Patent No. 201510234575.4, entitled "POWER BATTERY CELL CONNECTOR, POWER BATTERY MODULES, POWER BATTERY PACKAGES, AND CAR," filed on May 8, 2015, both of which are incorporated by reference in their entirety.

This application is also related to U.S. application Ser. No. 14/871,712, entitled "BATTERY CELL CONNECTOR," filed Sep. 30, 2015, and U.S. application Ser. No. 14/871,730, entitled "BATTERY CELL CONNECTOR," filed Sep. 30, 2015, both of which are incorporated by reference in their entirety.

TECHNICAL FIELD

The disclosed embodiments relate generally to apparatuses for connecting battery cells, and more particularly to apparatuses that electrically couple battery cells while providing mechanical rigidity and/or vibration dampening.

BACKGROUND

Batteries have become a commonplace form of energy storage (e.g., for use in hybrid and electric vehicles). Often, one or more battery cells (e.g., modules) are connected (e.g., in series or parallel) to increase the storage capacity and/or power output of the battery system. To connect two battery cells in series, an anode of a first battery is typically connected with a cable to the cathode of a second battery.

A problem with battery cell connections arises when batteries are used, for example, in vehicles, because battery cables offer little if any mechanical support. For example, tolerances between the shape and size of the battery cells, along with vibrations experienced by the battery system from operating in a vehicle (e.g., vibrations between battery cells), can lead to mechanical and/or electrical failure of the battery system.

SUMMARY

Thus, there is need for battery cell connectors that provide mechanical rigidity, support and/or vibration damping. To that end, disclosed are battery module connectors that provide mechanical support and/or vibration damping when connecting battery cells.

In accordance with some embodiments, a battery cell connector includes a plurality of segments. Each segment defines a respective plane and has a respective longitudinal axis. The battery cell connector further includes a plurality of bends coupling the plurality of segments together into a 3-D object, each bend located between a unique pair of adjacent segments of the plurality of segments, where the unique pair of adjacent segments define two distinct respective planes. A first segment of the plurality of segments includes one or more first connecting elements for a battery pole of a first battery cell and a second segment of the plurality of segments includes one or more second connecting elements for a battery pole of a second battery cell. The one or more first connecting elements are electrically coupled with the one or more second connecting elements.

BRIEF DESCRIPTION OF THE DRAWINGS

Like reference numerals refer to corresponding parts throughout the drawings.

DESCRIPTION OF EMBODIMENTS

The battery cell connectors described herein include a sheet of material (e.g., metal) with bends and turns configured in such a way as to provide mechanical rigidity and vibration dampening in one or more directions, thus providing mechanical support to the interconnects between battery cell terminals. For example, in some embodiments, the battery cell connectors described herein include segments of substantially flat sheets of metal that efficiently carry bending and shear loads along a longitudinal direction of each segment. The segments are coupled by bends (e.g., connections between two segments having non-planar longitudinal axes) and/or turns (e.g., connections between two segments having non-parallel, but planar, longitudinal axis). By coupling segments by bends and turns, the battery cell connectors described herein are configured into a three-dimensional (3-D) object that provides mechanical compressional/shearing rigidity (e.g., efficient carrying of bending and/or shear stress) in more than one direction (e.g., two or three perpendicular directions) as well as rotational rigidity along more than one rotational axis (e.g., two or three rotational axes). In addition, in some embodiments, the bends coupling segments act a stiff springs that provide vibration damping along one or more rotational axes. As described below, FIGS. 1-21 illustrate exemplary embodiments which are configured to provide rigid support and vibration dampening while fitting conveniently to existing battery module geometries (e.g., the embodiments described below describe example geometries for battery cell connectors).

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

Figure 1:
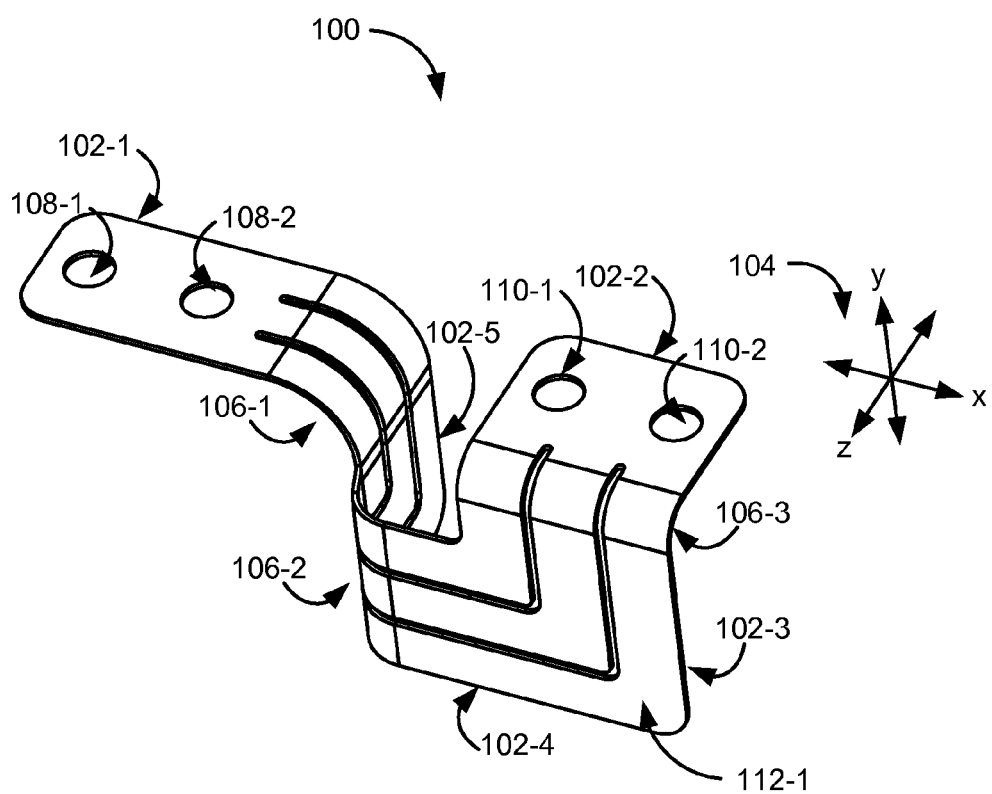
FIG. 1 illustrates a perspective view of a first battery cell connector, in accordance with some embodiments.

FIG. 1 illustrates a perspective view of a first battery cell connector 100 (e.g., also called a bus bar or a battery module connector), in accordance with some embodiments. First battery cell connector 100 includes a plurality of segments 102 (e.g., segments 102-1 through 102-5). In some embodiments, a battery cell connector includes two segments, three segments, or more segments. For example, first battery cell connector 100 includes five segments.

Each segment 102 defines a respective plane (e.g., lies in the respective plane). For example, as shown by axes 104, segments 102-1 and 102-2 are parallel to an xz-plane; segments 102-3 and 102-4 are parallel to a xy-plane; segment 102-5 is parallel to a yz-plane. In some embodiments, a battery cell connector includes a plurality of segments that define a plurality of respective planes (e.g., two or three planes). For example, first battery cell connector 100 includes five segments that define three planes (e.g., xy-plane, xz-plane, and yz-plane). In some embodiments, for example, as shown in first battery cell connector 100, the three planes are mutually substantially perpendicular.

Each segment has a respective longitudinal axis. For example, segments 102-1 and 102-4 have respective longitudinal axes along the x-direction; segment 102-2 has a longitudinal axis along the z-direction; segments 102-3 and 102-5 have respective longitudinal axes along the y-direction. In some embodiments, a segment's longitudinal axis is along a direction from a center of the segment to an adjacent bend or turn. In some embodiments, a segment's longitudinal axis is along a direction connecting a bend or a turn on a first end of the segment and a bend or a turn on a second end of the segment, opposite the first.

First battery cell connector 100 includes a plurality of bends 106 (e.g., bend 106-1; bend 106-2; and bend 106-3) coupling the plurality of segments together into a 3-D object (e.g., an object having substantial spatial extent and/or substantial rigidity in three orthogonal directions). The plurality of bends coupling the plurality of segments into a 3-D object comprises bends pointing in at least three different directions (e.g., having bending axes along three distinct directions). In some embodiments, the three different directions are orthogonal (perpendicular) directions. In some embodiments, at least two of the plurality of bends are not parallel to each other. In some embodiments, at least three of the plurality of bends are not parallel to each other. In some embodiments, two bends are not parallel to each other when they have respective bending axes that are not parallel to each other. Each bend 106 is located between (e.g., couples) a unique pair of adjacent segments of the plurality of segments. For example, bend 106-1 is located between segment 102-1 and segment 102-5; bend 106-2 is located between segment 102-5 and segment 102-4; and bend 106-3 is located between segment 102-3 and segment 102-2. In this example, bend 106-1 has an axis that is approximately in the z-direction; bend 106-2 has an axis that is approximately in the y-direction; and bend 106-3 has an axis that is approximately in the x-direction. As will be described below in connection with FIGS. 26A-26C, the first battery cell connector 100 is formed from a two-dimensional U-shape metal sheet 2606 by bending different portions of the U-shape metal sheet 2606 into different directions at predefined locations. For example, both terminal segments are formed by bending the corresponding side portions of the U-shape metal sheet 2606 into two opposite directions perpendicular to the plane defined by the U-shape metal sheet 2606 (see, e.g., 2626-2 and 2626-3 in FIG. 26C) and another bend 2626-1 is formed by bending the bottom portion of the U-shape metal sheet 2606. The unique pair of adjacent segments on either side of a bend defines two distinct respective planes. In some embodiments, the two distinctive planes are perpendicular to one another (e.g., the bend is a 90 degree bend). In some embodiments, a bend has a radius of curvature. In some embodiment, a bend is bent along a respective bending axis that is parallel with both of the two distinct respective planes (e.g., the bend is characterized by a bending axis). For example, the bending axis for bend 106-1 is parallel to the z-axis. In some embodiments, the plurality of bends 106 includes at least three bends having three distinct bending axes. In some embodiments, the three distinct bending axes are perpendicular to one another. In some embodiments, the plurality of bends serves as vibration dampening elements (e.g., damp vibrations along directions perpendicular to the bend's respective bending axis).

In some embodiments, the battery cell connector is for use in a vehicle (e.g., an electrical car) and the bends are elastically deformable under predefined operating conditions of the vehicle (e.g., vibration or shock). For example, in some embodiments, the bends act as springs having a stiffness designed to dampen one or more resonance modes of the vehicle and/or the battery system.

In the example shown in FIG. 1, segment 102-1 is a first segment of the plurality of segments 102 that includes one or more first connecting elements 108 for a battery pole (e.g., an anode, a cathode, or a connecting terminal or contact for an anode or a cathode) of a first battery cell. Segment 102-2 is a second segment of the plurality of segments 102 that includes one or more second connecting elements 110 for a battery pole of a second battery cell. In some embodiments, the first connecting elements 108 include at least two connecting elements (e.g., first connecting elements 108-1 and 108-2) to provide rotational stiffness for the connection to the first battery cell. In some embodiments, the second connecting elements include at least two connecting elements (e.g., second connecting elements 110-1 and 110-2) to provide rotational stiffness for the connection to the second battery cell. In some embodiments, a respective connecting element of the first connecting elements and the second connecting elements comprises an opening adapted to receive a battery terminal, wherein the battery terminal is mechanically connected at least partially along a circumference of the opening (e.g., as shown in first battery cell connector 100, each of the connecting elements 108/110 comprises an opening adapted to receive a battery terminal, which may comprise a bolt screwed into the battery). The one or more first connecting elements are electrically coupled with the one or more second connecting elements. In some embodiments, the plurality of segments comprise an electrical conductor forming the electrical coupling between the one or more first connecting elements 108 and the one or more second connecting elements 110. In some embodiments, for example as shown in first battery cell connector 100, the plurality of segments and the plurality of bends are formed by a single continuous metal sheet that comprises an electrical conductor forming the electrical coupling between the one or more first connecting elements 108 and the one or more second connecting elements 110. In some embodiments, the connector 100 is made of copper or aluminum.

In some embodiments, the segments 102 that include connecting elements 108/110 do not have a clearly discernible longitudinal axis. In some embodiments, the segments 102 that include connecting elements 108/110 are respective segments in a plurality of segments that includes one or more additional segments, each additional segment having a longitudinal axis.

In some embodiments, first battery cell connector 100 includes one or more (or a plurality of) turns 112 (for visual clarity, only a single turn 112-1 is given a reference number in FIG. 1). Each turn 112 couples a second unique pair of adjacent segments 102 in the plurality of segments 102. For example, turn 112-1 couples segment 102-3 and 102-4. The second unique pair of adjacent segments 102 have distinct respective longitudinal axes within the same respective plane. For example, segment 102-3 has a longitudinal axis in the y-direction, segment 102-4 has a longitudinal axis in the x-direction, and both segment 102-3 and 102-4 are parallel with the xy-plane. In some embodiments, the respective axes of segments coupled by a turn are perpendicular (e.g., the segments form an L-shape). In some embodiments, the plurality of segments has an L-shaped opening (e.g., at least a portion of the opening is L-shaped).

Figure 2:
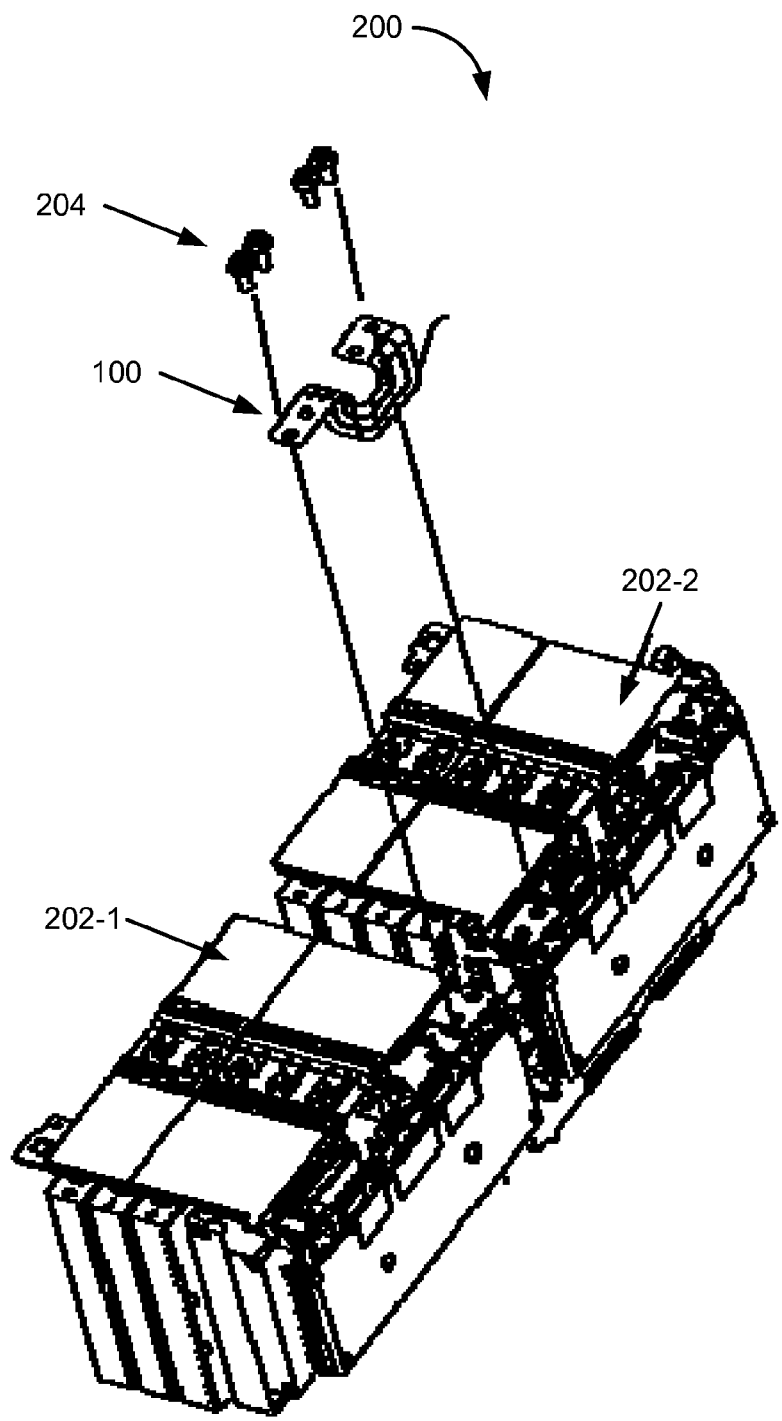
FIG. 2 illustrates a partially-exploded-view of a first battery system utilizing the first battery cell connector, in accordance with some embodiments.
Figure 3:
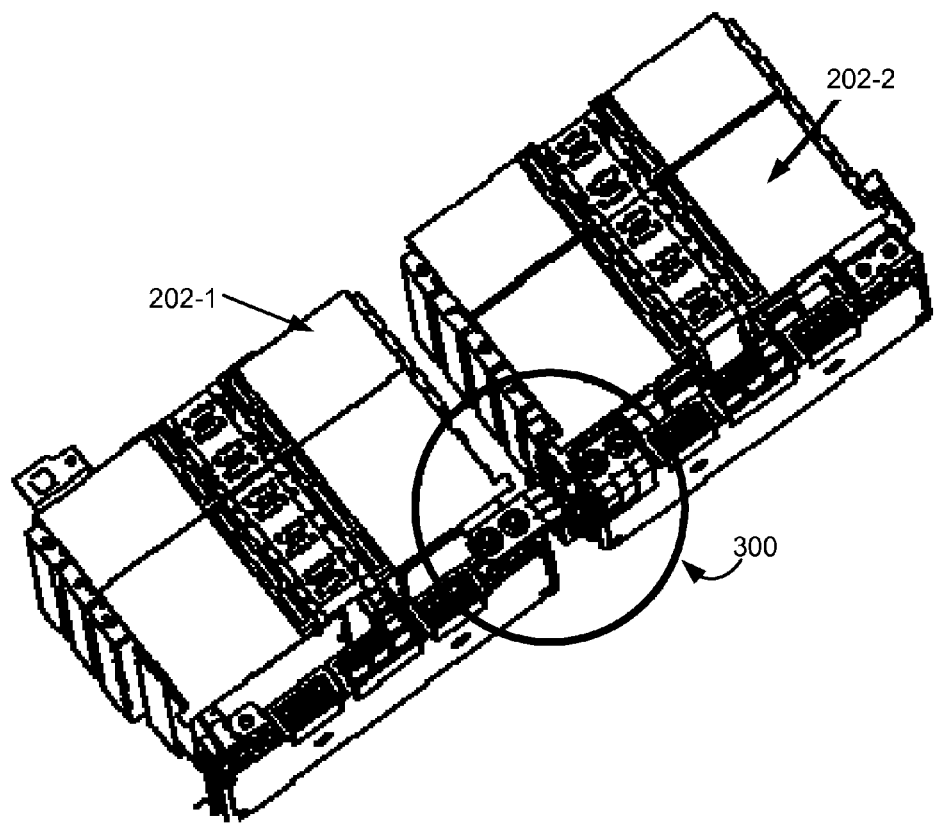
FIG. 3 illustrates an assembly view of the first battery system utilizing the first battery cell connector, in accordance with some embodiments.
Figure 4:
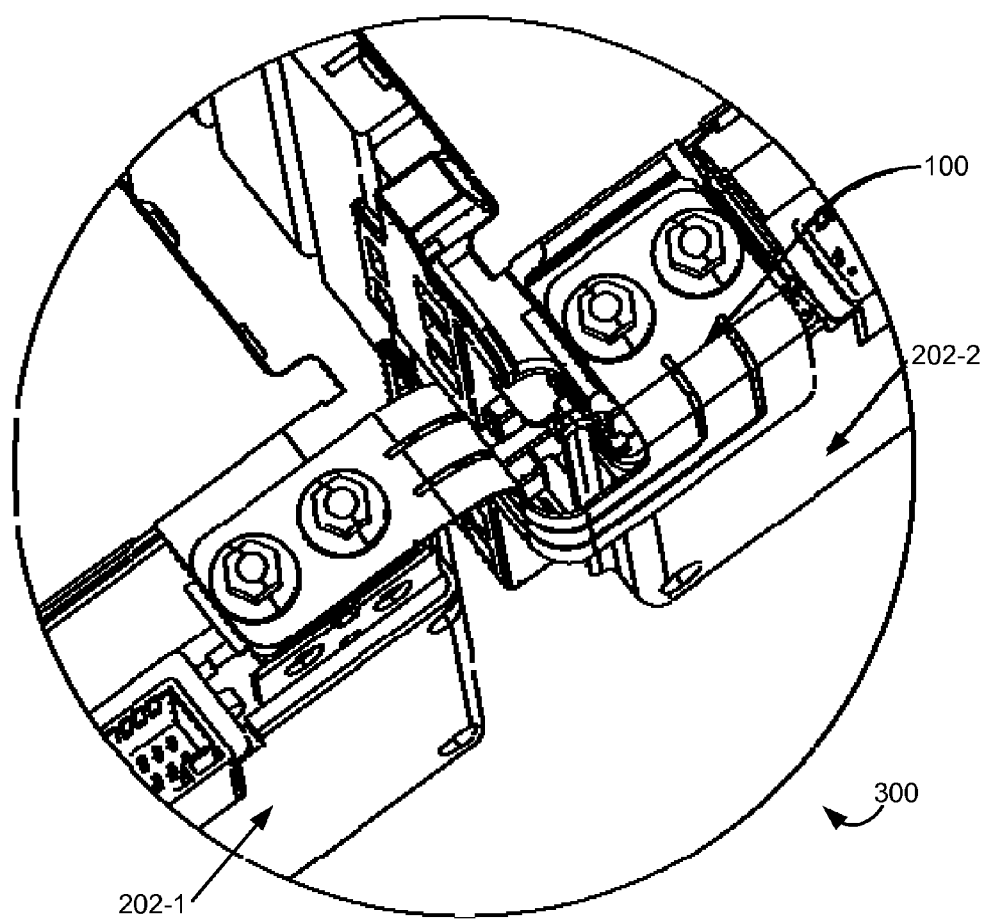
FIG. 4 illustrates a close-up of a portion of the assembly view of the first battery system utilizing the first battery cell connector, in accordance with some embodiments.

FIGS. 2-4 illustrate alternate views of first battery cell connector 100, in accordance with some embodiments. FIG. 2 illustrates a partially-exploded-view of a first battery system 200 utilizing first battery cell connector 100. Battery system 200 includes a plurality of (e.g., two or more) battery cells (also called modules) 202 (e.g., battery cell/module 202-1 and 202-2). First battery cell connector 100 is coupled with battery cell/module 202-1 and 202-2 by bolts 204 running through connecting elements 108/110 (FIG. 1), where the bolts serve as terminals of the battery cells. For example, in some embodiments, a cathode of battery cell/module 202-1 is coupled with an anode of battery cell/module 202-2 so that battery cell/module 202-1 and battery cell/module 202-2 are electrically connected in series. FIG. 3 illustrates an assembly view of the first battery system 200 utilizing the first battery cell connector 100, in accordance with some embodiments. FIG. 4 illustrates a close-up of a portion 300 of the assembly view of the first battery system 200 utilizing the first battery cell connector 100, in accordance with some embodiments. In particular, FIG. 3 illustrates that first battery cell connector 100 fits snuggly (e.g., securely) between battery cell/module 202-1 and battery cell/module 202-2.

Figure 5:
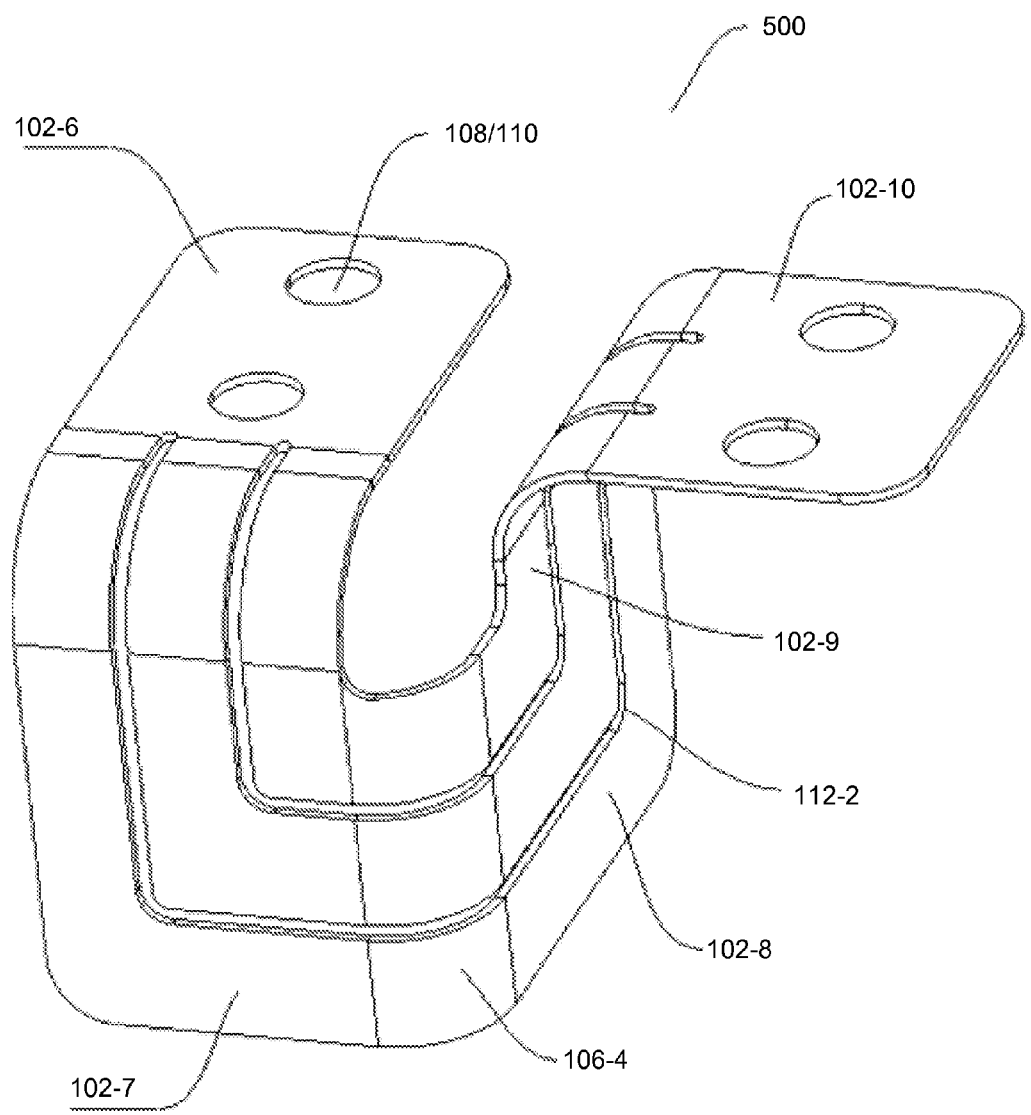
FIG. 5 illustrates a perspective view of a second battery cell connector, in accordance with some embodiments.
Figure 6:
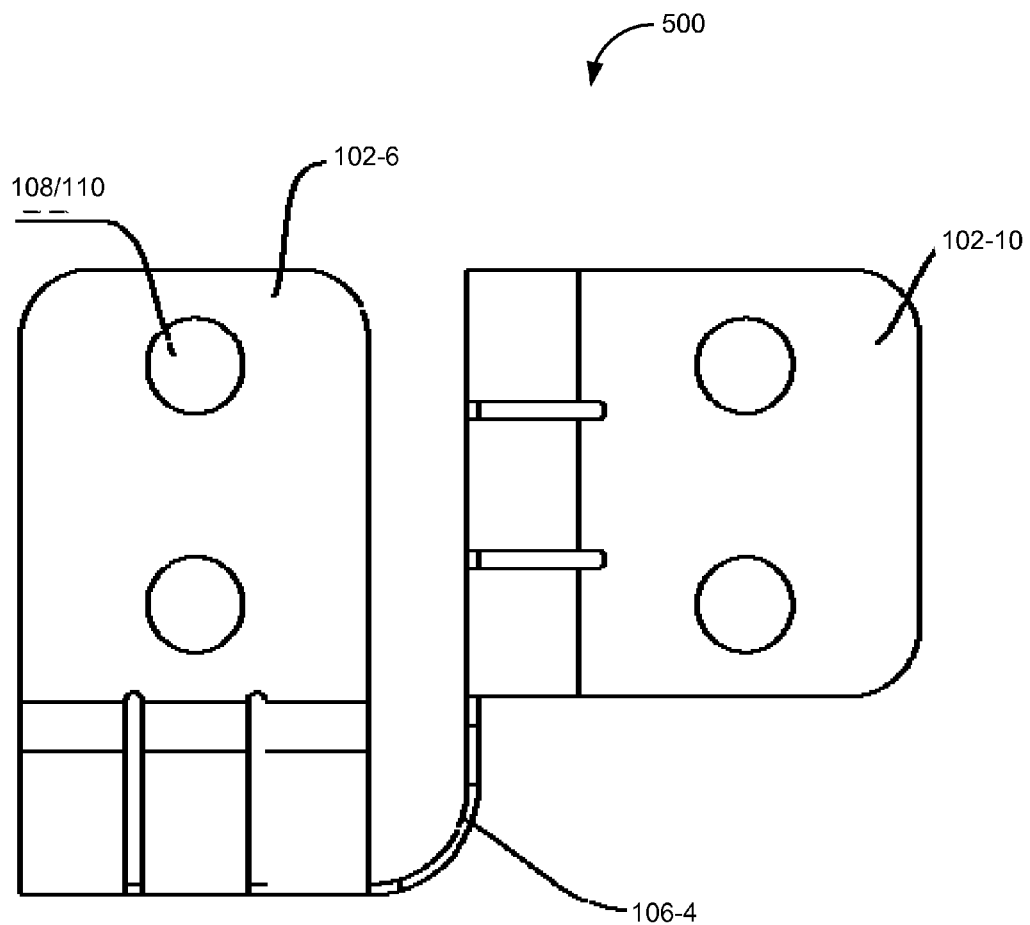
FIG. 6 illustrates a top view of the second battery cell connector, in accordance with some embodiments.
Figure 7:
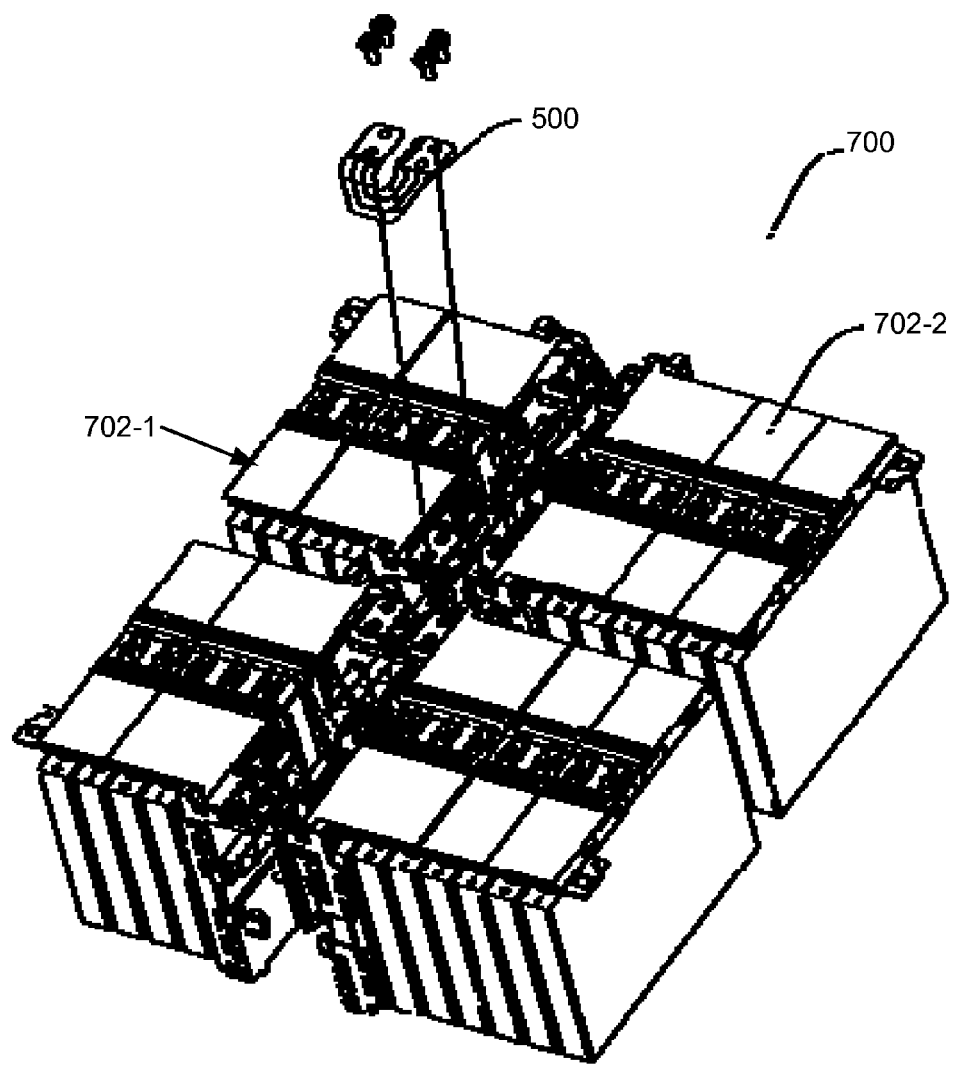
FIG. 7 illustrates a partially-exploded-view of a second battery system utilizing the second battery cell connector, in accordance with some embodiments.
Figure 8:
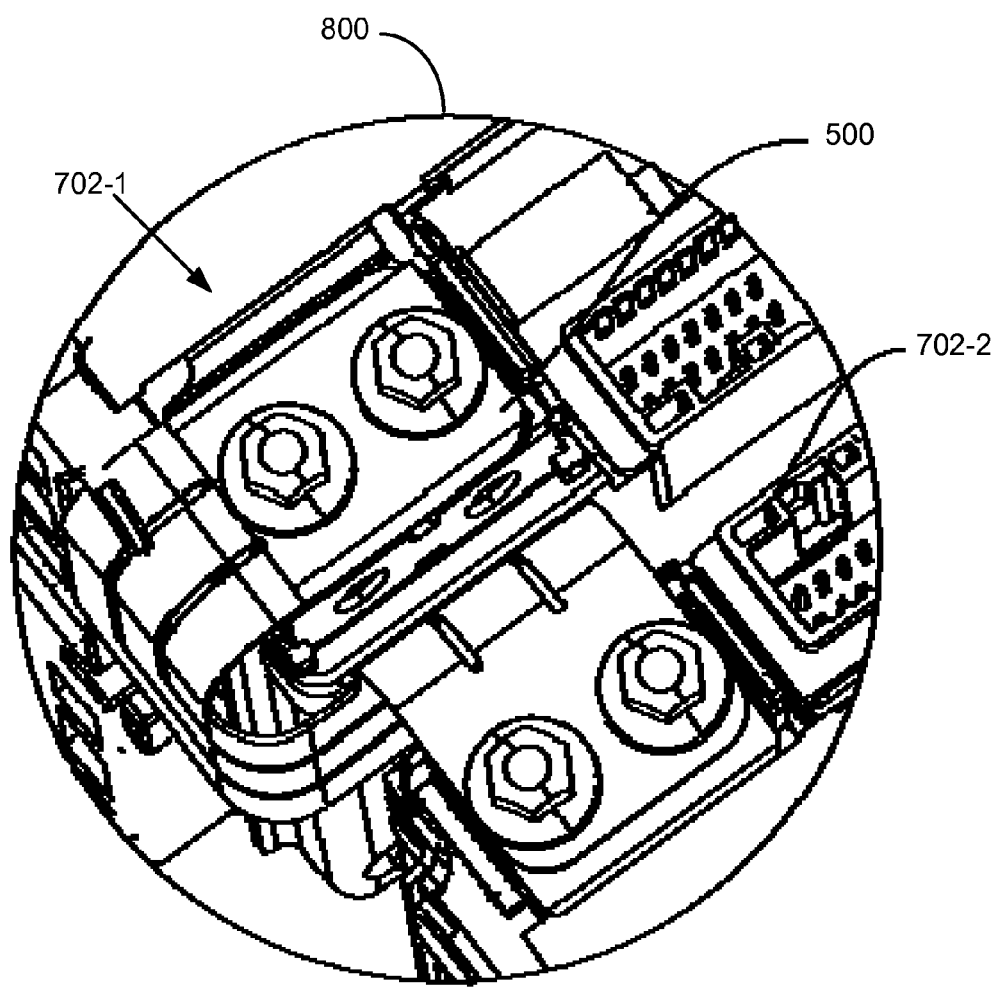
FIG. 8 illustrates a close-up of a portion of an assembly view of the second battery system utilizing the second battery cell connector, in accordance with some embodiments.

FIGS. 5-8 illustrate various views of a second battery cell connector 500, in accordance with some embodiments. In particular, FIG. 5 illustrates a perspective view of second battery cell connector 500; FIG. 6 illustrates a top view of second battery cell connector 500; FIG. 7 illustrates a partially-exploded-view of second battery system 700 utilizing second battery cell connector 500; and FIG. 8 illustrates a close-up of a portion 800 of an assembly view of the second battery system 700 utilizing second battery cell connector 500. Second battery cell connector 500 is largely analogous to first battery cell connector 100, but second battery cell connector 500 is arranged geometrically differently from first battery cell connector 100. Nevertheless, second battery cell connector 500 includes a plurality of segments 102 (e.g., segments 102-6 through 102-10 and optionally others, not labeled for visual clarity), a plurality of bends 106 (e.g., bends 106-4 and optionally others, not labeled for visual clarity), connecting elements 108/110, and a plurality of turns 112 (e.g., turn 112-2 and optionally others, not labeled for visual clarity). Segments 102, bends 106, connecting elements 108/110 and turns 112 have analogous features to those described above with reference to FIGS. 1-4. As shown in FIGS. 7-8, second battery cell connector 500 is used to connect battery cell/module 702-1 and battery cell/module 702-2.

Figure 9:
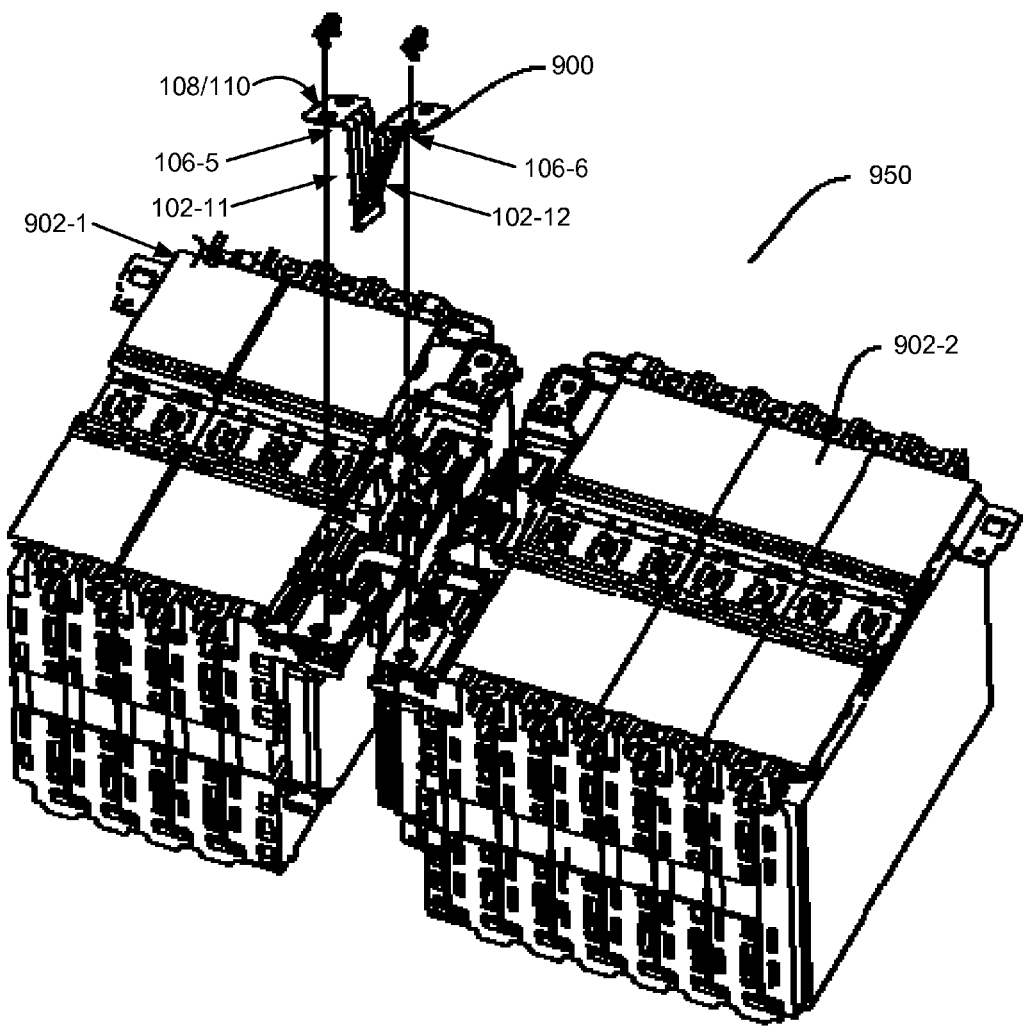
FIG. 9 illustrates a partially-exploded-view of a third battery system utilizing a third battery cell connector, in accordance with some embodiments.
Figure 10:
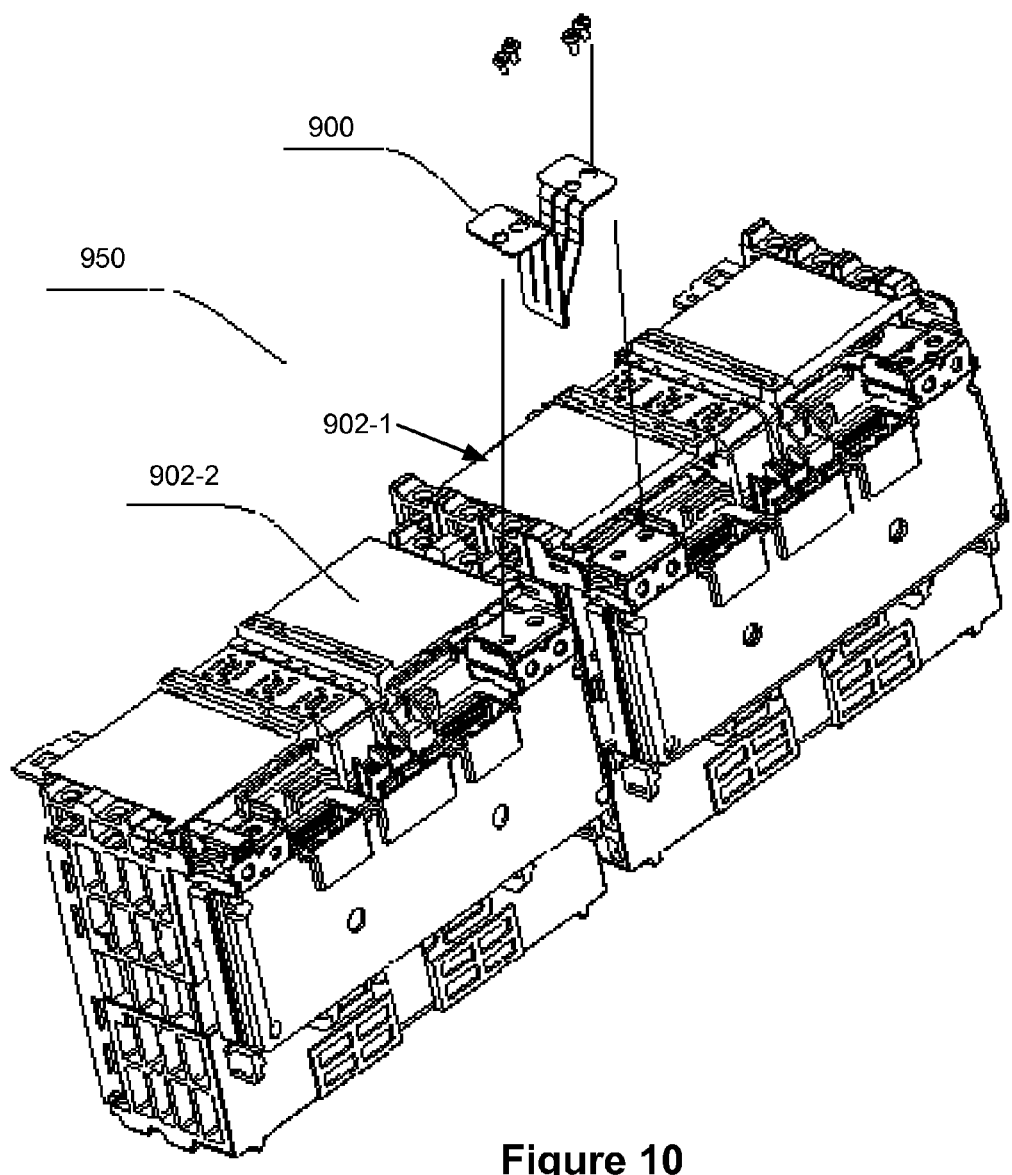
FIG. 10 illustrates another partially-exploded-view of the third battery system utilizing the third battery cell connector, in accordance with some embodiments.
Figure 11:
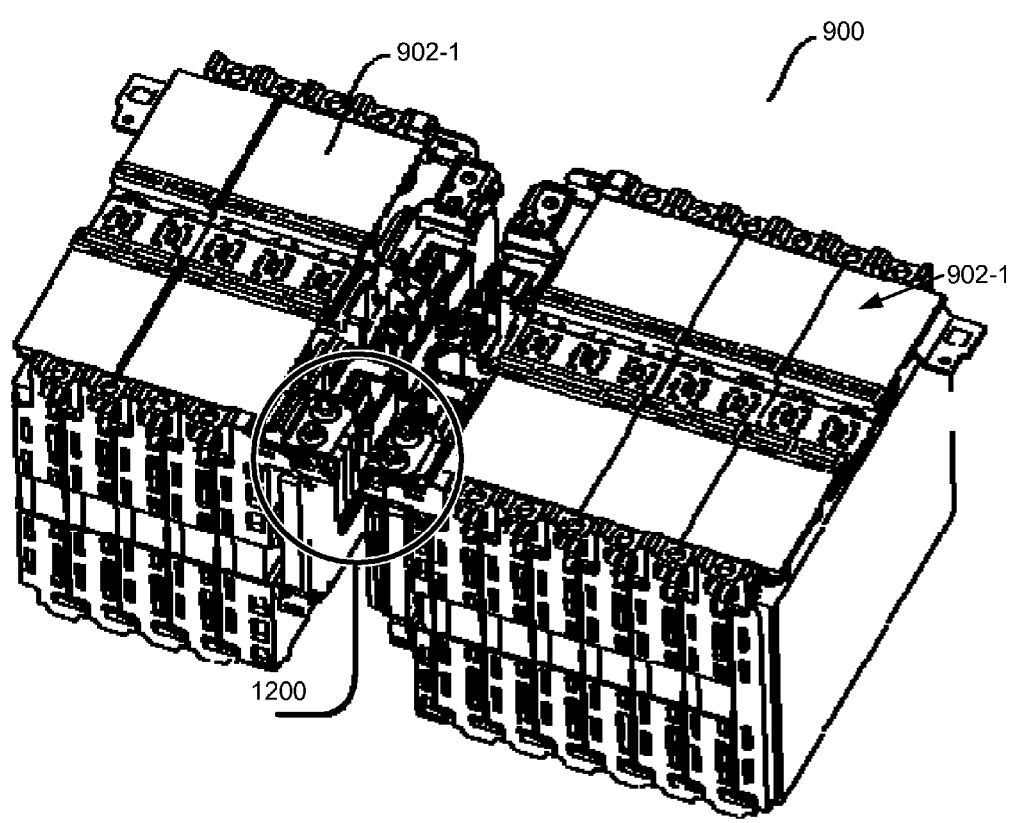
FIG. 11 illustrates an assembly view of the third battery system utilizing the third battery cell connector, in accordance with some embodiments.
Figure 12:
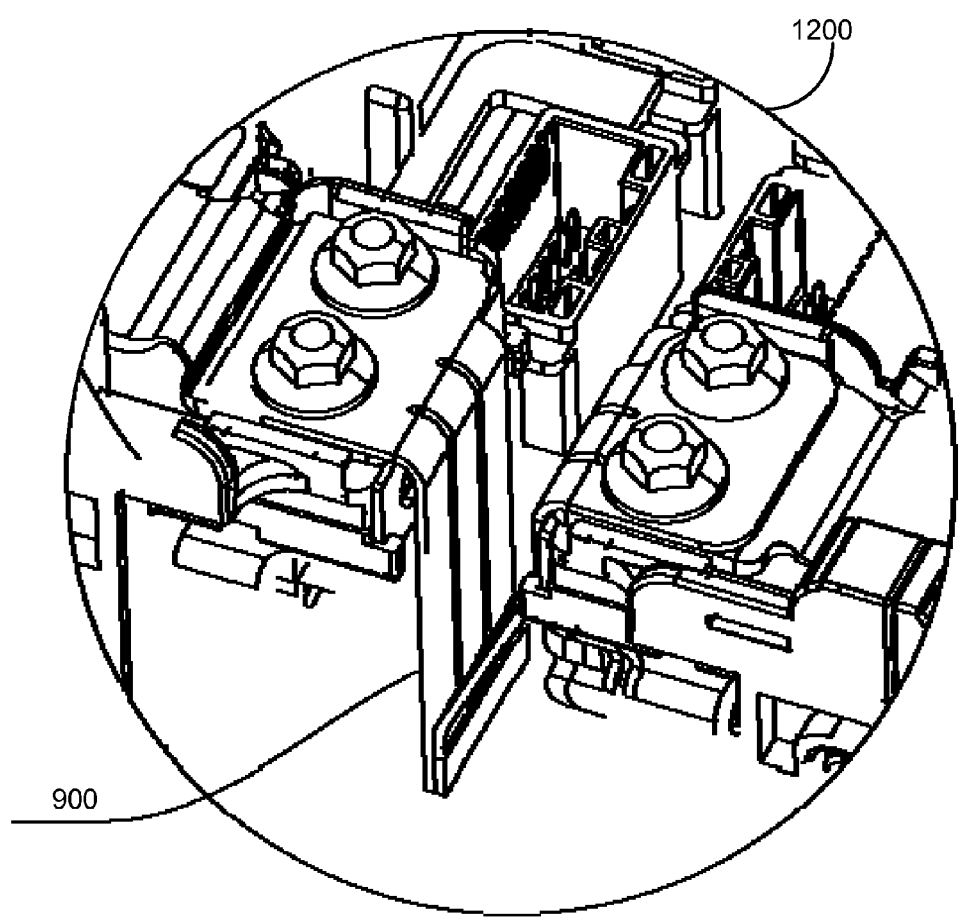
FIG. 12 illustrates a close-up of a portion of the assembly view of the third battery system utilizing the third battery cell connector, in accordance with some embodiments.

FIGS. 9-12 illustrate various views of a third battery cell connector 900, in accordance with some embodiments. In particular, FIG. 9 illustrates a partially-exploded-view of a third battery system 950 utilizing third battery cell connector 900; FIG. 10 illustrates another partially-exploded-view of third battery system 950 utilizing third battery cell connector 900; FIG. 11 illustrates an assembly view of third battery system 950 utilizing third battery cell connector 900; and FIG. 12 illustrates a close-up of a portion 1200 of the assembly view of third battery system 950 utilizing the third battery cell connector 900. Third battery cell connector 900 includes a plurality of segments 102; a plurality of bends 106 (e.g., bends 106-5 and 106-6), and connecting elements 108/110, which each have analogous features to those described above with reference to FIGS. 1-4. However, two respective segments 102 (to wit, segment 102-11 and 102-12) of third battery cell connector 900 are welded together (e.g., coupled together by a weld) to form a spring (e.g., a shock absorber or vibration dampener). In some embodiments, the spring forms a tweezer structure. In some embodiments, the tweezer structure includes two planar segments having planes separated by a single rotation (e.g., not a compound or multi-dimensional rotation) of a few degrees (e.g., between 5-30 degrees). In some embodiments, each longitudinal axis of the respective segments 102 of third battery cell connector 900 lie in a common plane. In some embodiments, third battery cell connector 900 does not include any turns. In some embodiments, the longitudinal axes of each segment of third battery cell connector 900 are co-planar. As shown in FIGS. 11-12, the welded segments of third battery cell connector 900 are configured to be positioned between respective battery/cells modules with the common plane of their longitudinal axes perpendicular to the plane of attachment to the battery terminals.

Figure 13:
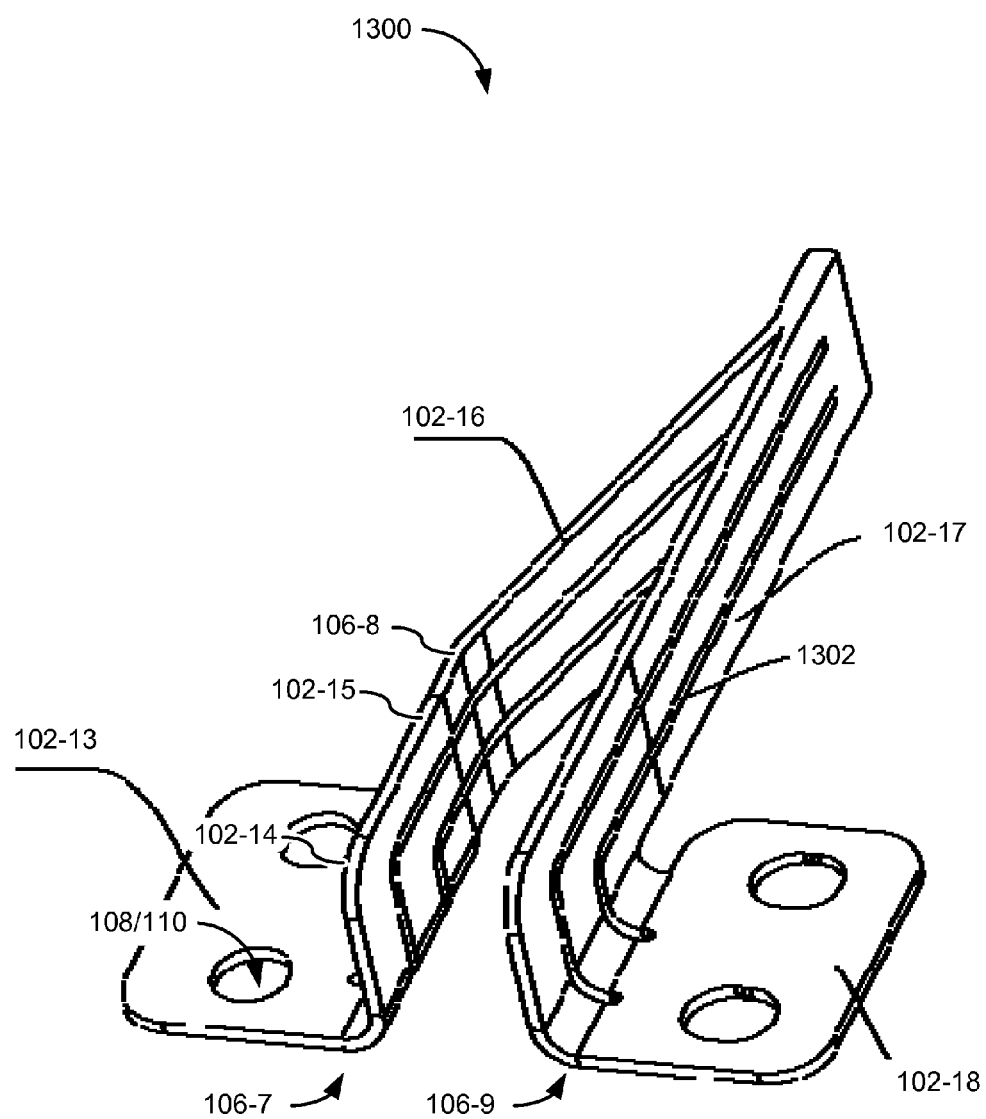
FIG. 13 illustrates a perspective view of a fourth battery cell connector, in accordance with some embodiments.
Figure 14:
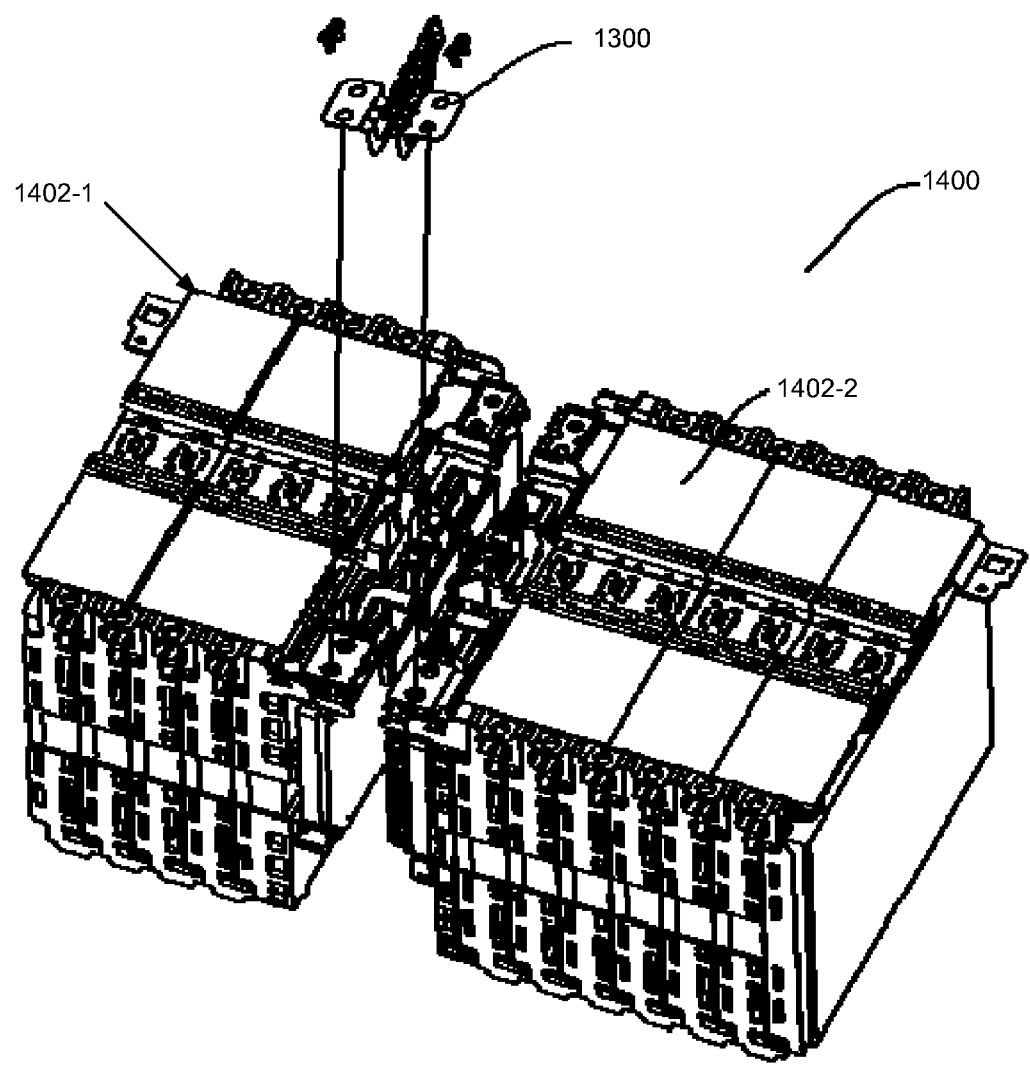
FIG. 14 illustrates a partially-exploded-view of a fourth battery system utilizing the fourth battery cell connector, in accordance with some embodiments.
Figure 15:
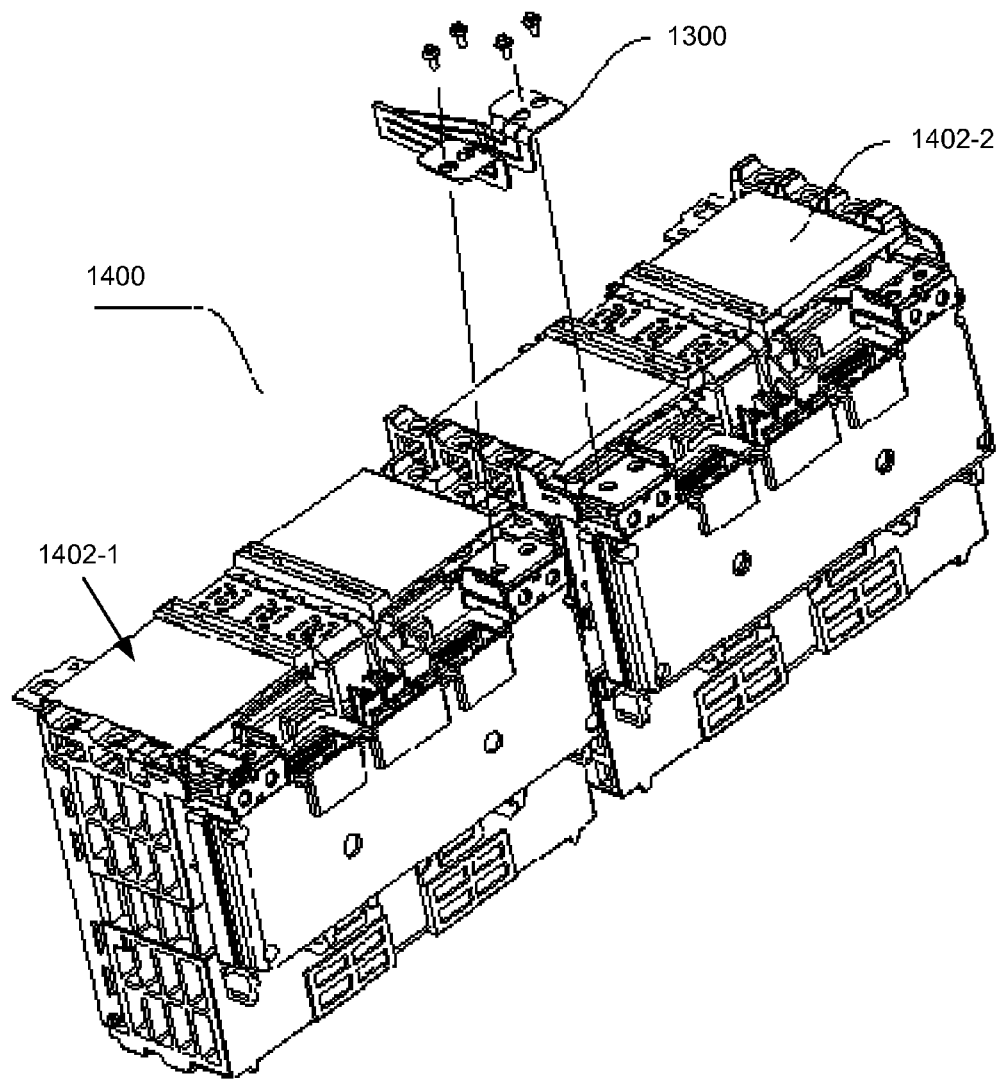
FIG. 15 illustrates another partially-exploded-view of the fourth battery system utilizing the fourth battery cell connector, in accordance with some embodiments.
Figure 16:
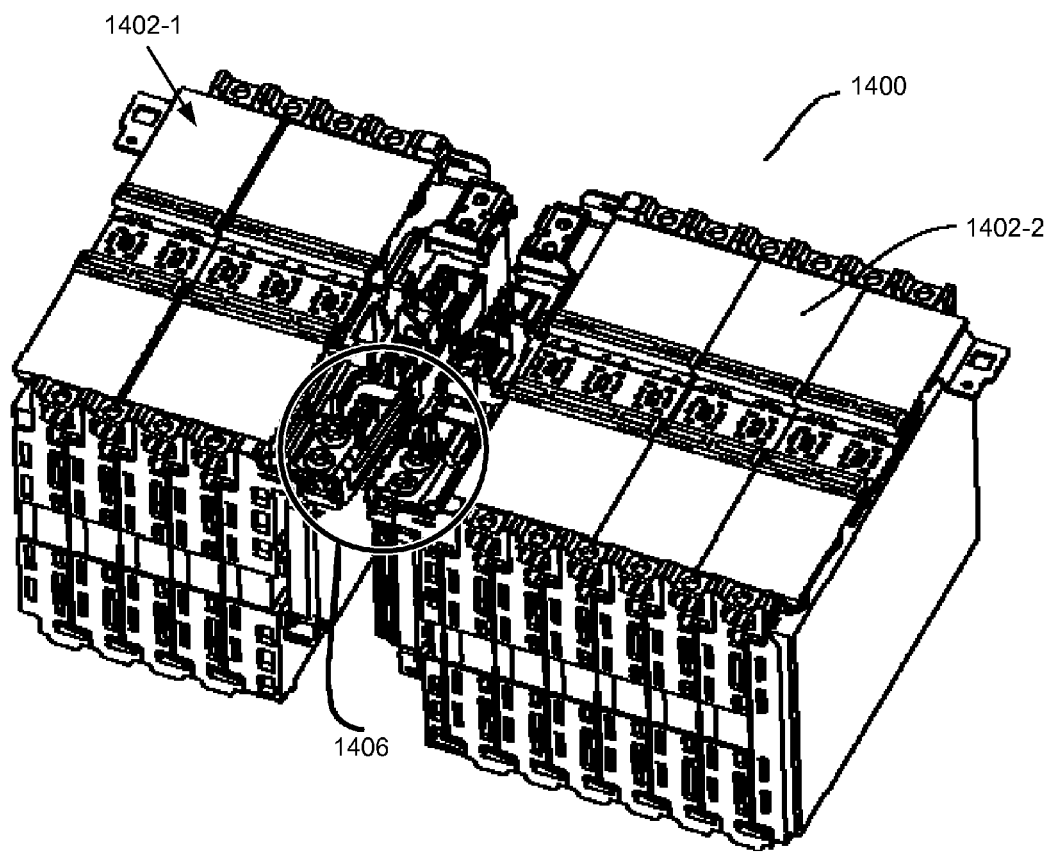
FIG. 16 illustrates an assembly view of the fourth battery system utilizing the fourth battery cell connector, in accordance with some embodiments.
Figure 17:
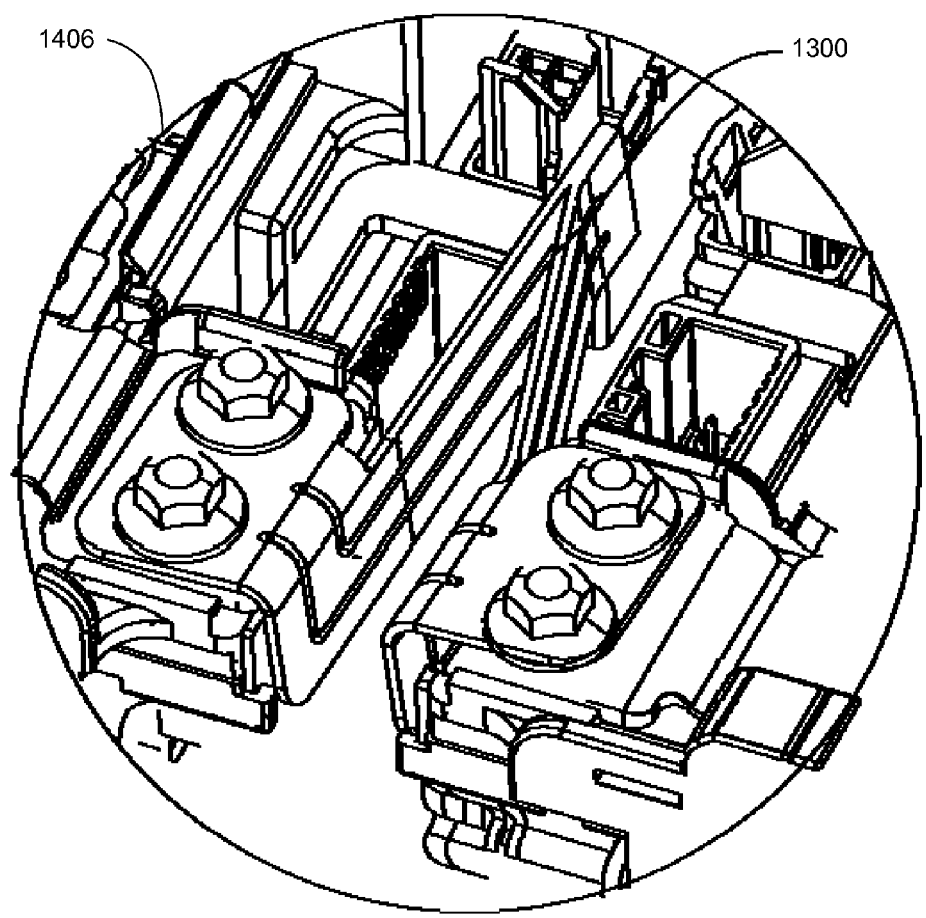
FIG. 17 illustrates a close-up of a portion of the assembly view of the fourth battery system utilizing the fourth battery cell connector, in accordance with some embodiments.

FIGS. 13-17 illustrate various views of a fourth battery cell connector 1300, in accordance with some embodiments. In particular, FIG. 13 illustrates a perspective view of a fourth battery cell connector 1300; FIG. 14 illustrates a partially-exploded-view of fourth battery system 1400 utilizing fourth battery cell connector 1300; FIG. 15 illustrates another partially-exploded-view of fourth battery system 1400 utilizing fourth battery cell connector 1300; FIG. 16 illustrates an assembly view of fourth battery system 1400 utilizing the fourth battery cell connector 1300; and FIG. 17 illustrates a close-up of a portion 1406 of the assembly view of fourth battery system 1400 utilizing fourth battery cell connector 1300, in accordance with some embodiments. Fourth battery cell connector 1300 includes a plurality of segments 102 (e.g., segments 102-13 through 102-18); a plurality of bends 106 (e.g., bends 106-7 through 106-9), and connecting elements 108/110, as described above. Fourth battery cell connector 1300 electrically couples battery cell module 1402-1 and battery cell module 1402-2 of fourth battery system 1400. Fourth battery cell connector 1300 is largely analogous to third battery cell connector 900 (e.g., includes two welded segments that together form a spring/tweezer structure). However, the longitudinal axes of each non-terminal segment of fourth battery cell connector 1300 are parallel with the respective planes of the terminal segments of battery cell connector 1300. As shown in FIGS. 16-17, the welded segments of fourth battery cell connector 1300 are configured to be positioned between respective battery/cells modules with their longitudinal axes lying in a plane parallel to the plane of attachment to the battery terminals. The plurality of segments 102 of fourth battery cell connector 1300 has an L-shaped opening 1302.

Figure 18:
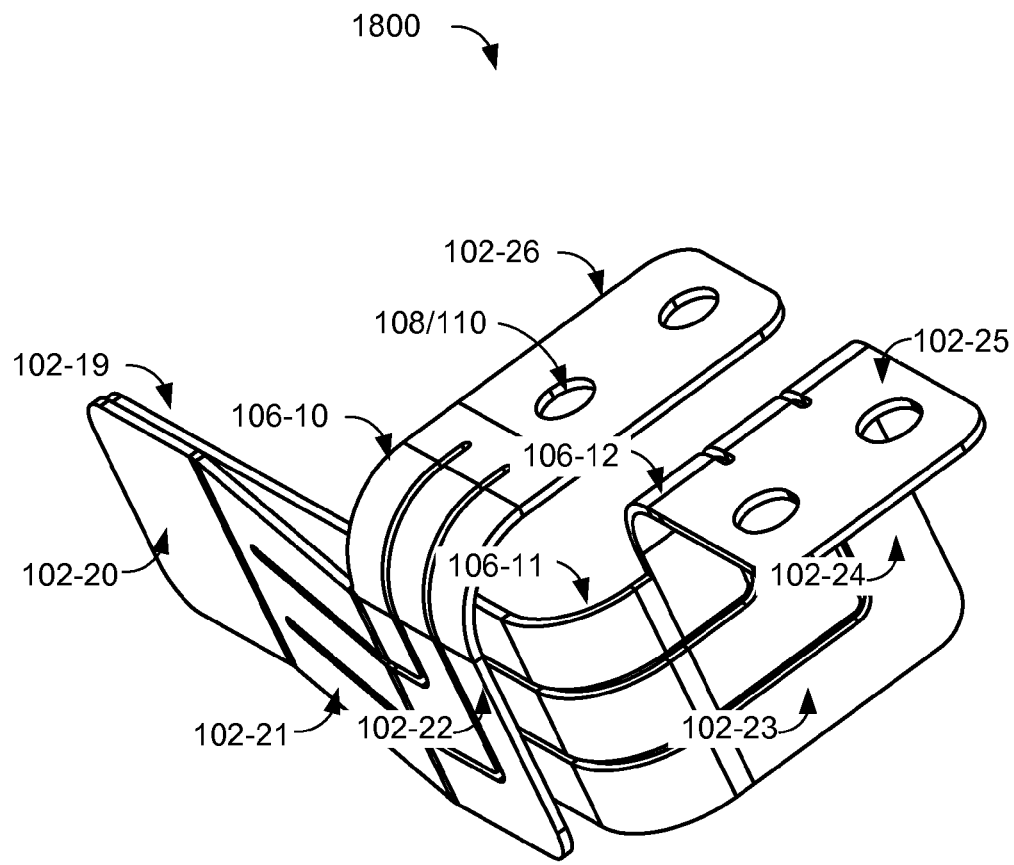
FIG. 18 illustrates a perspective view of a fifth battery cell connector, in accordance with some embodiments.
Figure 19:
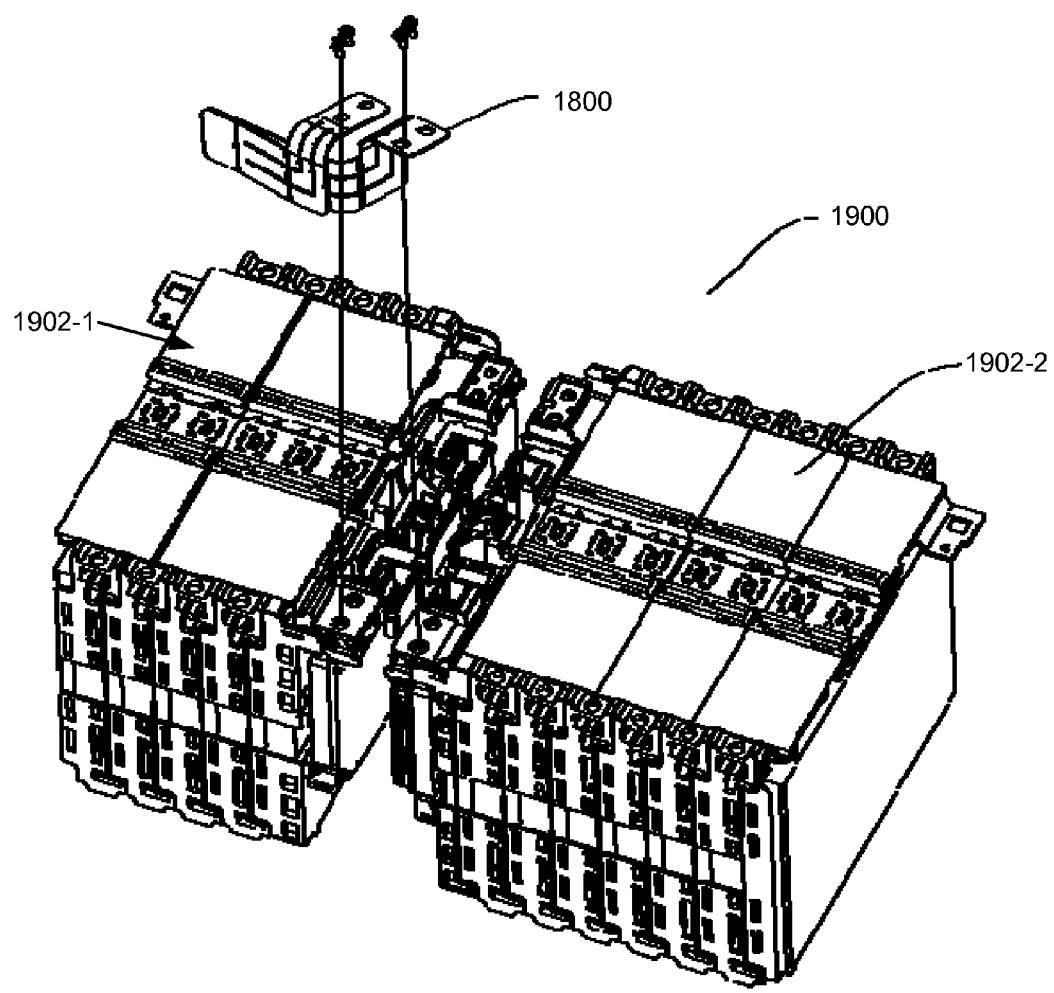
FIG. 19 illustrates a partially-exploded-view of a fifth battery system utilizing the fifth battery cell connector, in accordance with some embodiments.
Figure 20:
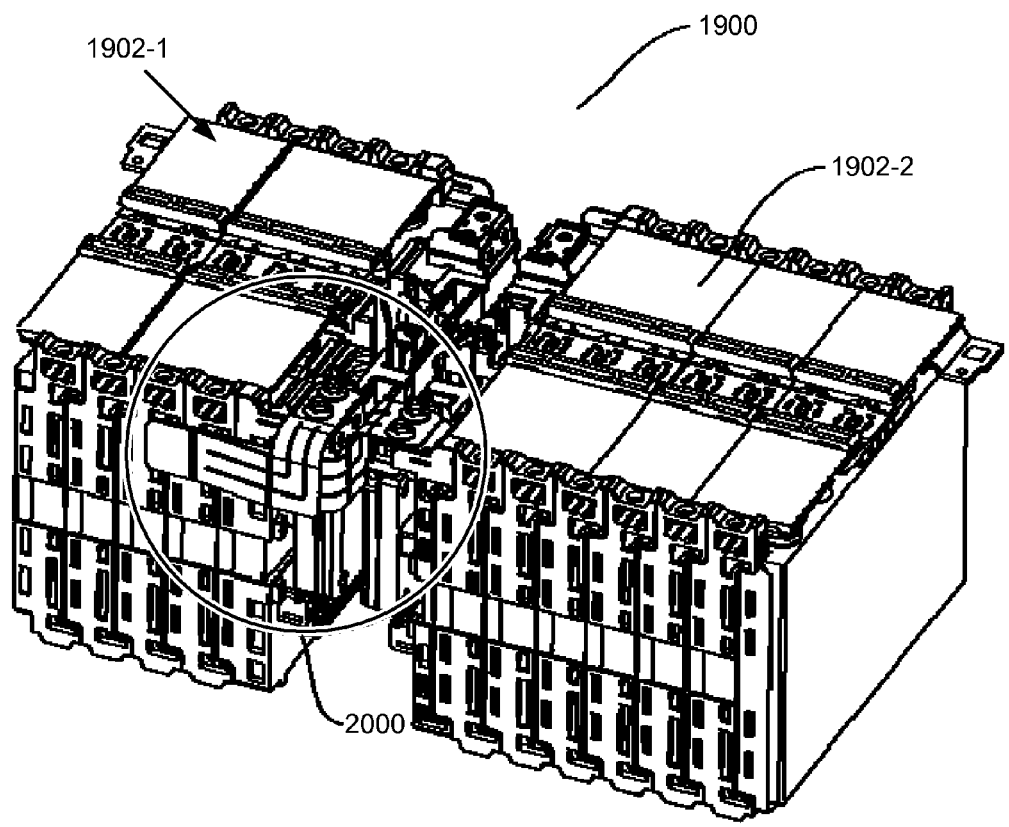
FIG. 20 illustrates an assembly view of the fifth battery system utilizing the fifth battery cell connector, in accordance with some embodiments.
Figure 21:
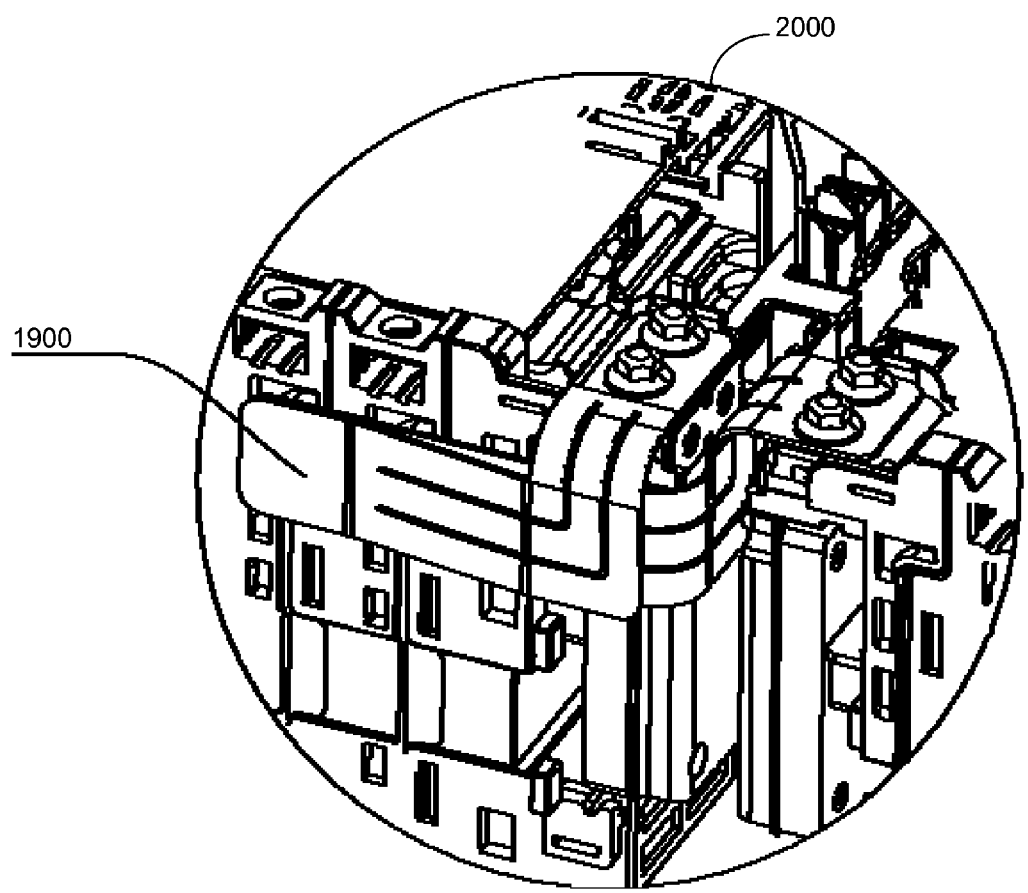
FIG. 21 illustrates a close-up of a portion of the assembly view of the fifth battery system utilizing the fifth battery cell connector, in accordance with some embodiments.

FIGS. 18-21 illustrate various views of a fifth battery cell connector 1800, in accordance with some embodiments. In particular, FIG. 18 illustrates a perspective view of fifth battery cell connector 1800; FIG. 19 illustrates a partially-exploded-view of a fifth battery system 1900 utilizing fifth battery cell connector 1800; FIG. 20 illustrates an assembly view of fifth battery system 1900 utilizing fifth battery cell connector 1800; and FIG. 21 illustrates a close-up of a portion 2000 of the assembly view of fifth battery system 1900 utilizing fifth battery cell connector 1800, in accordance with some embodiments. Fifth battery cell connector 1800 includes a plurality of segments 102 (e.g., segments 102-19 through 102-26); a plurality of bends 106 (e.g., bends 106-10 through 106-12), and connecting elements 108/110, as described above. Fifth battery cell connector 1800 electrically couples battery cell/module 1902-1 and battery cell/module 1902-2 of fifth battery system 1900. Fifth battery cell connector 1800 is largely analogous to third battery cell connector 900 (e.g., includes two welded segments that together form a spring/tweezer structure). As shown in FIGS. 20-21, the welded segments of fifth battery cell connector 1800 are configured to be positioned adjacent to and outside of the respective battery/cells modules connect by fifth battery cell connector 1800. Moreover, the welded segments of fifth battery cell connector 1800 have their longitudinal axes in a plane parallel to the plane of attachment to the battery terminals.

Figure 22A:
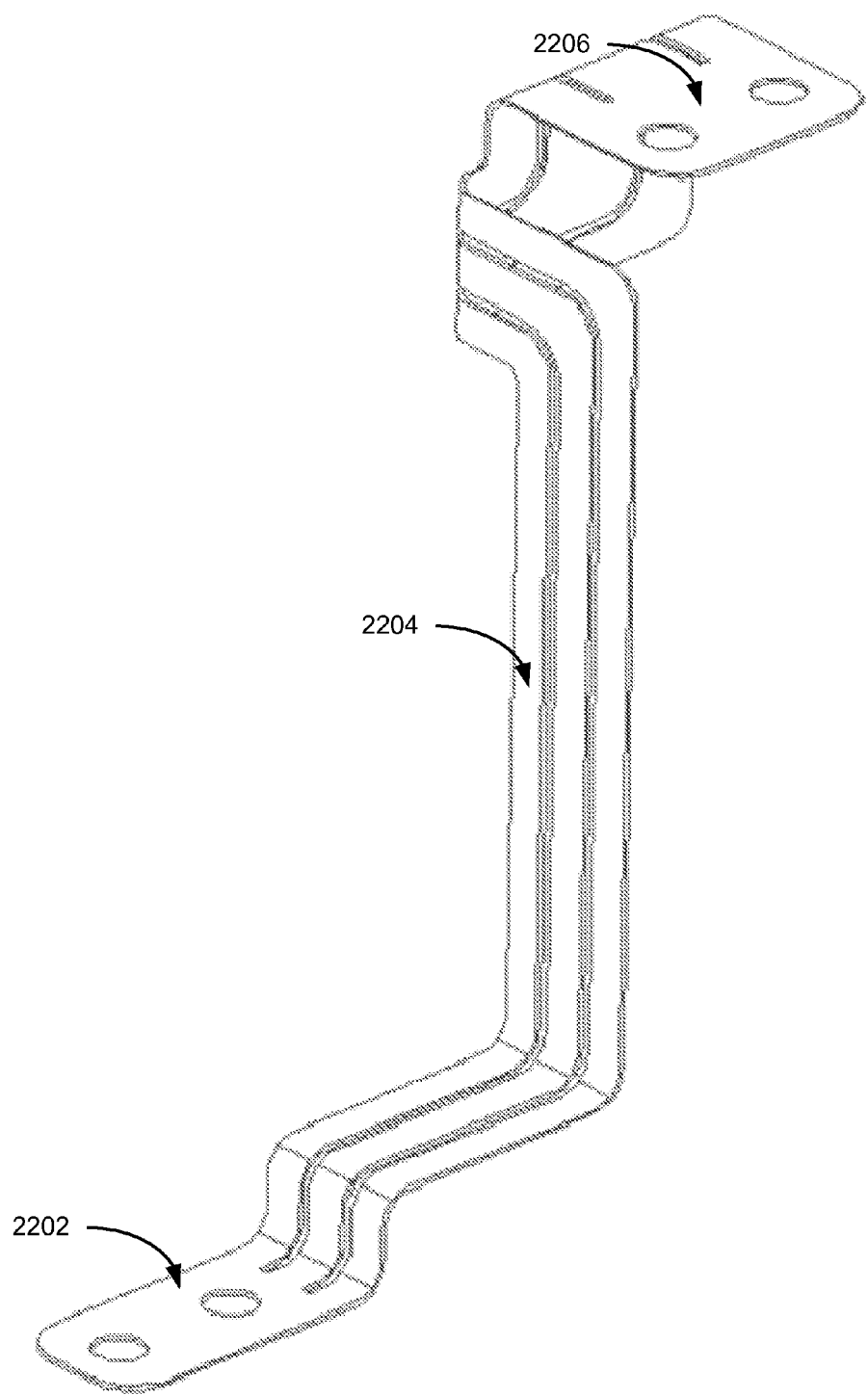
FIG. 22A illustrates a perspective view of an additional battery cell connector, in accordance with some embodiments.
Figure 22B:
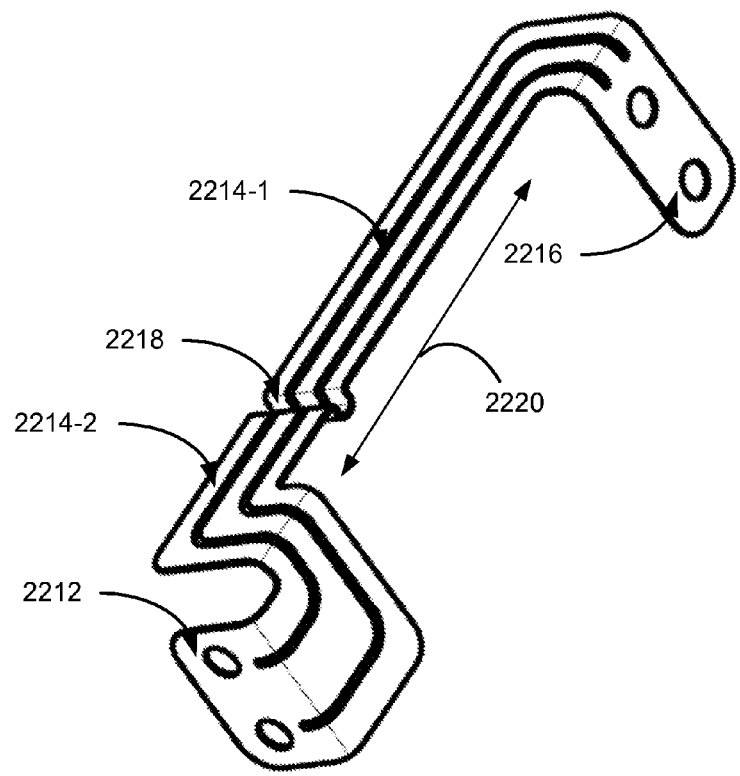
FIG. 22B illustrates another perspective view of the battery cell connector shown in FIG. 22A, in accordance with some embodiments.
Figure 23:
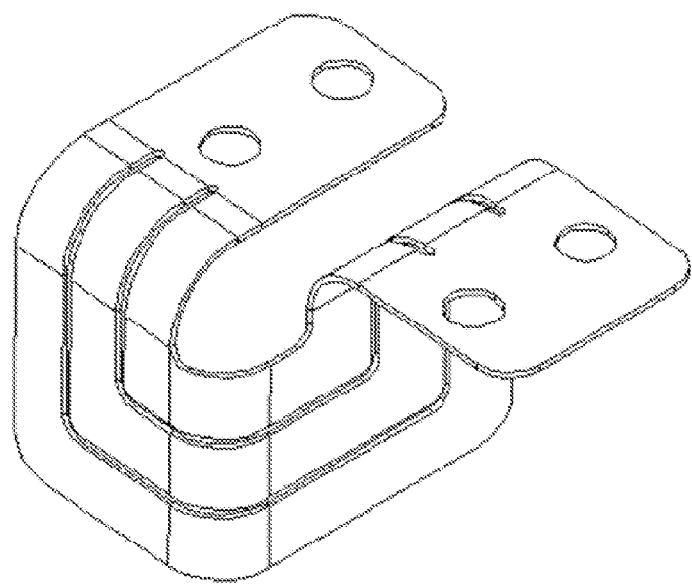
FIG. 23 illustrates a perspective view of another battery cell connector, in accordance with some embodiments.

FIGS. 22A-22B and FIG. 23 illustrate perspective views of additional battery cell connectors, in accordance with various embodiments. The battery cell connectors shown in FIGS. 22A-22B and FIG. 23 are largely analogous to the other battery cell connectors formed of a single metal sheet discussed above. However, the battery cell connectors shown in FIGS. 22A-22B and FIG. 23 illustrate the wide variety of arrangements of bends, segments, and turns that are contemplated. For example, in FIG. 22A, the battery cell connector has an elongated intermediate segment 2204 between the first terminal segment 2202 and the second terminal segment 2206. There are multiple bends and other intermediate segments connecting each end of the elongated segment 2204 to one of the first terminal segment 2202 and the second terminal segment 2206. FIG. 22B depicts a battery cell connector that is a slight variation of the battery cell connector shown in FIG. 22A. In particular, the elongated intermediate segment (2214-1, 2214-2) between the first terminal segment 2212 and the second terminal segment 2216 has a bump 2218. This bump is formed by bending the elongated intermediate segment 2214 and separates the elongated intermediate segment into two sub-segments 2214-1 and 2214-2. This bump 2218 serves as a spring that is elastically deformable along the axis 2220 of the elongated intermediate segment 2214 to absorb the vibration movement between the battery cells connected to the two terminal segments 2220 and 2216. In some embodiments, the elongated intermediate segment 2214 includes more than one bump; in some other embodiments, the bump may be present in more than one segment including both intermediate segments and terminal segments.

Figure 24:
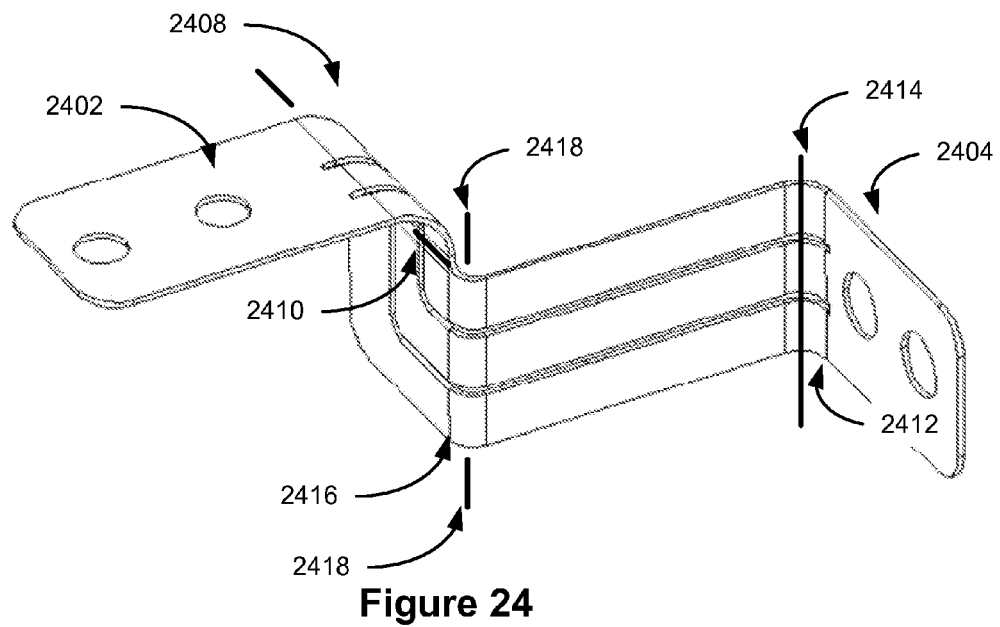
FIG. 24 illustrates a perspective view of another battery cell connector, in accordance with some embodiments.
Figure 25:
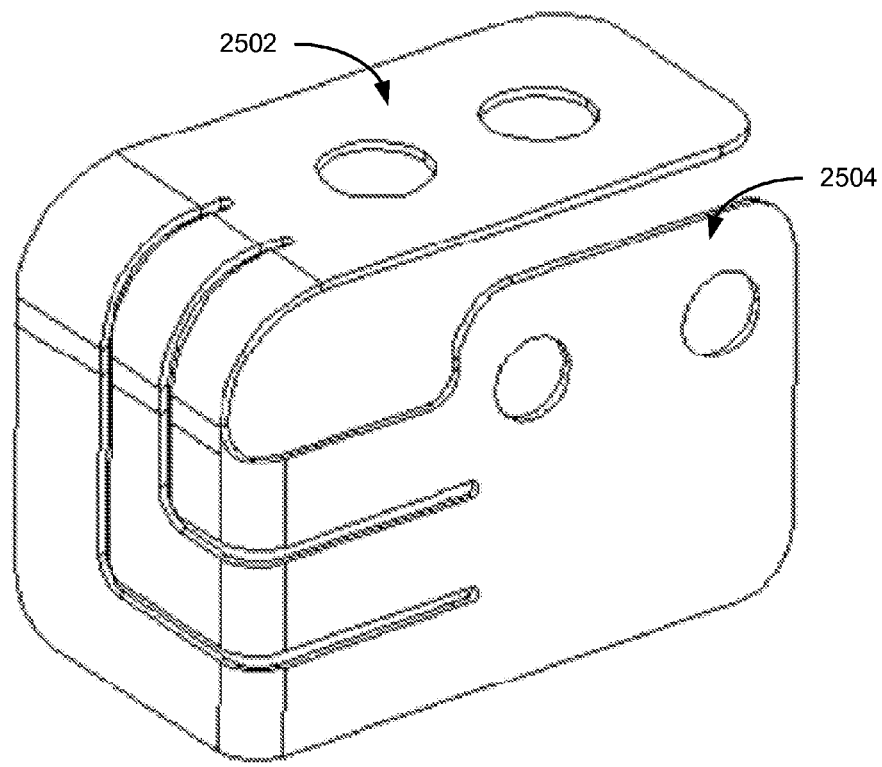
FIG. 25 illustrates a perspective view of another battery cell connector, in accordance with some embodiments.

As shown in FIGS. 24-25, in some embodiments, a battery cell connector is provided that is formed of single continuous metal sheet. The battery cell connector includes a plurality of segments including a first terminal segment that includes one or more first connecting elements for a battery pole of a first battery cell; a second terminal segment that includes one or more second connecting elements for a battery pole of a second battery cell; and a plurality of additional segments connecting the first terminal segment to the second terminal segment. Each additional segment defines a respective plane and having a respective longitudinal axis. The battery cell connector also includes a plurality of bends coupling the plurality of segments together into a 3-D object, each bend located between a unique pair of adjacent segments of the plurality of segments. The unique pair of adjacent segments define two distinct respective planes. The first terminal segment is not parallel to the second terminal segment and the one or more first connecting elements are electrically coupled with the one or more second connecting elements. For example, as shown in FIG. 24, the plurality of bends includes a first bend 2408 having a first bending axis 2410 and a second bend 2412 having a second bending axis 2414 that is substantially perpendicular to the first bending axis. First terminal segment 2402 is not parallel to second terminal segment 2404. In some embodiments, first terminal segment 2402 is substantially perpendicular to second terminal segment 2404. In some embodiments, the battery cell connector includes a third bend with a bending axis parallel to either the first bending axis or the second bending axis.

As shown in FIG. 25, in some embodiments, the battery cell connector includes only two bends. In some embodiments, the battery cell connector further comprises a single turn that, together with the two bends, forms the plurality of segments into the 3-D object. In FIG. 25, first terminal segment 2502 is not parallel to second terminal segment 2504.

In some embodiments, at least two continuous sheets of metal, the at least two continuous sheets of metal coupled together by the welding of the two respective segments forming the spring. In some embodiments, the plurality of bends point to at least three different directions. In some embodiments, the first and second segments of the plurality of segments are not parallel to each other.

Alternatively, in some embodiments, a battery cell connector is provided that is formed of two or more continuous metal sheets. Battery cell connector 900 (discussed above with reference to FIGS. 9-12), battery cell connector 1300 (discussed above with reference to FIGS. 13-17) and battery cell connector 1800 (discussed above with reference to FIGS. 18-21) are examples of such a battery cell connector. In some embodiments, the battery cell connector includes a plurality of segments of a metal conducting sheet, each segment defining a respective plane and having a respective longitudinal axis. The battery cell connector also includes a plurality of bends coupling the plurality of segments together into a 3-D object, each bend located between a unique pair of adjacent segments of the plurality of segments. The unique pair of adjacent segments define two distinct respective planes. The battery cell connector includes at least one spring comprising two respective segments welded together (e.g., in a "tweezer" arrangement"). A first segment of the plurality of segments includes one or more first connecting elements for a battery pole of a first battery cell. A second segment of the plurality of segments includes one or more second connecting elements for a battery pole of a second battery cell. The one or more first connecting elements are electrically coupled with the one or more second connecting elements.

Figure 26A:
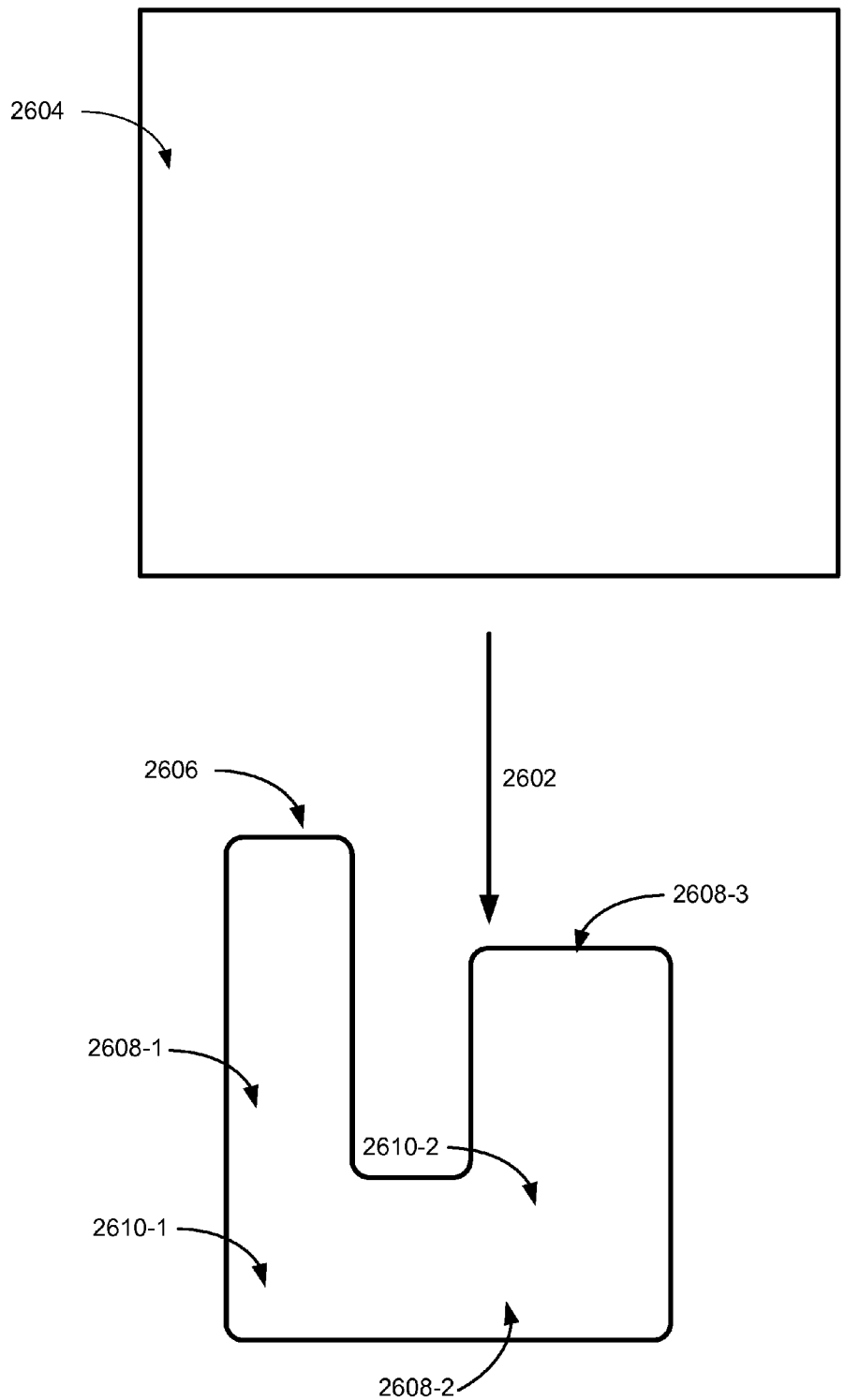
FIGS. 26A-26C illustrate a sheet metal process in accordance with some embodiments.
Figure 26B:
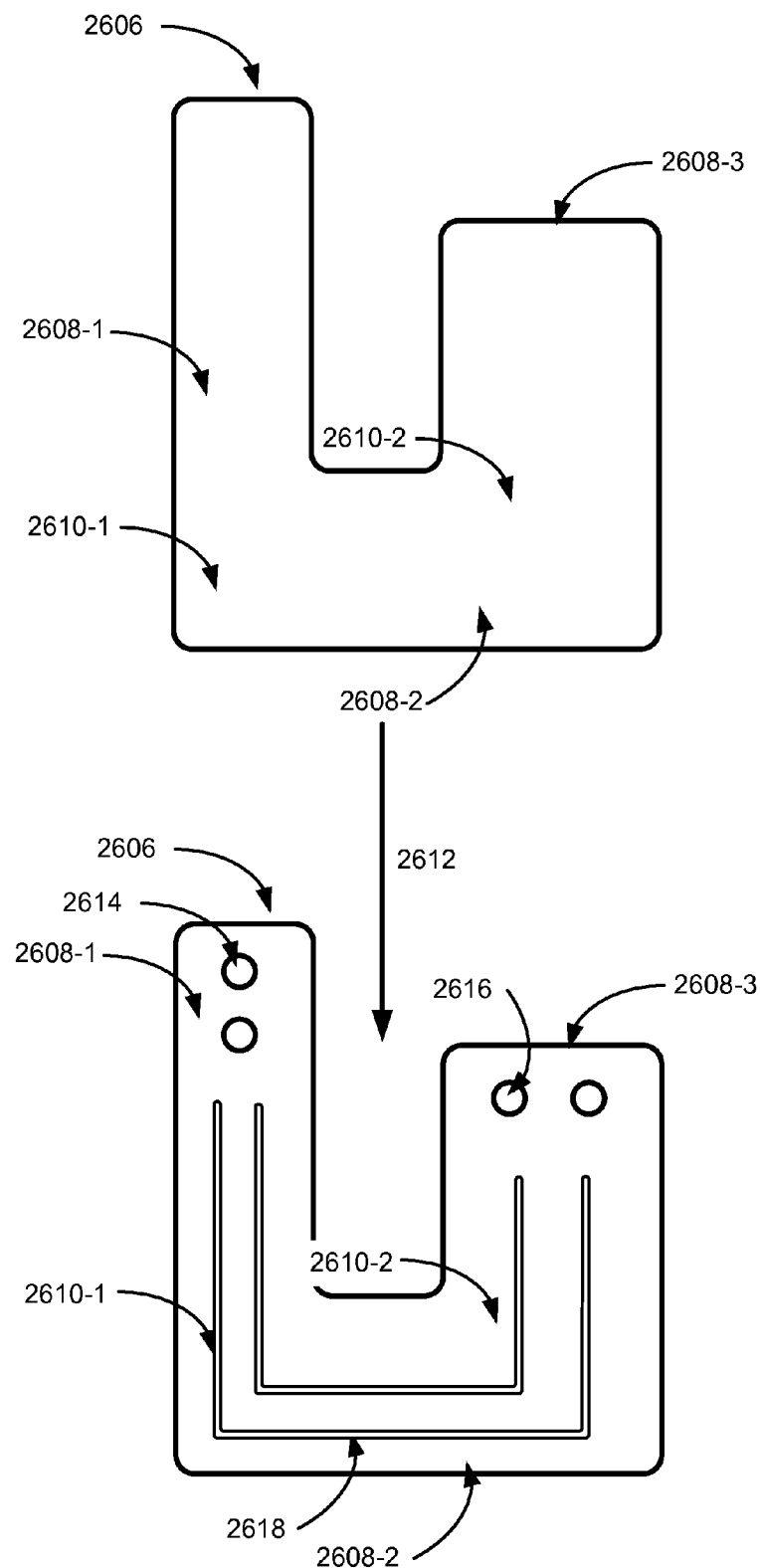
Figure 26C:
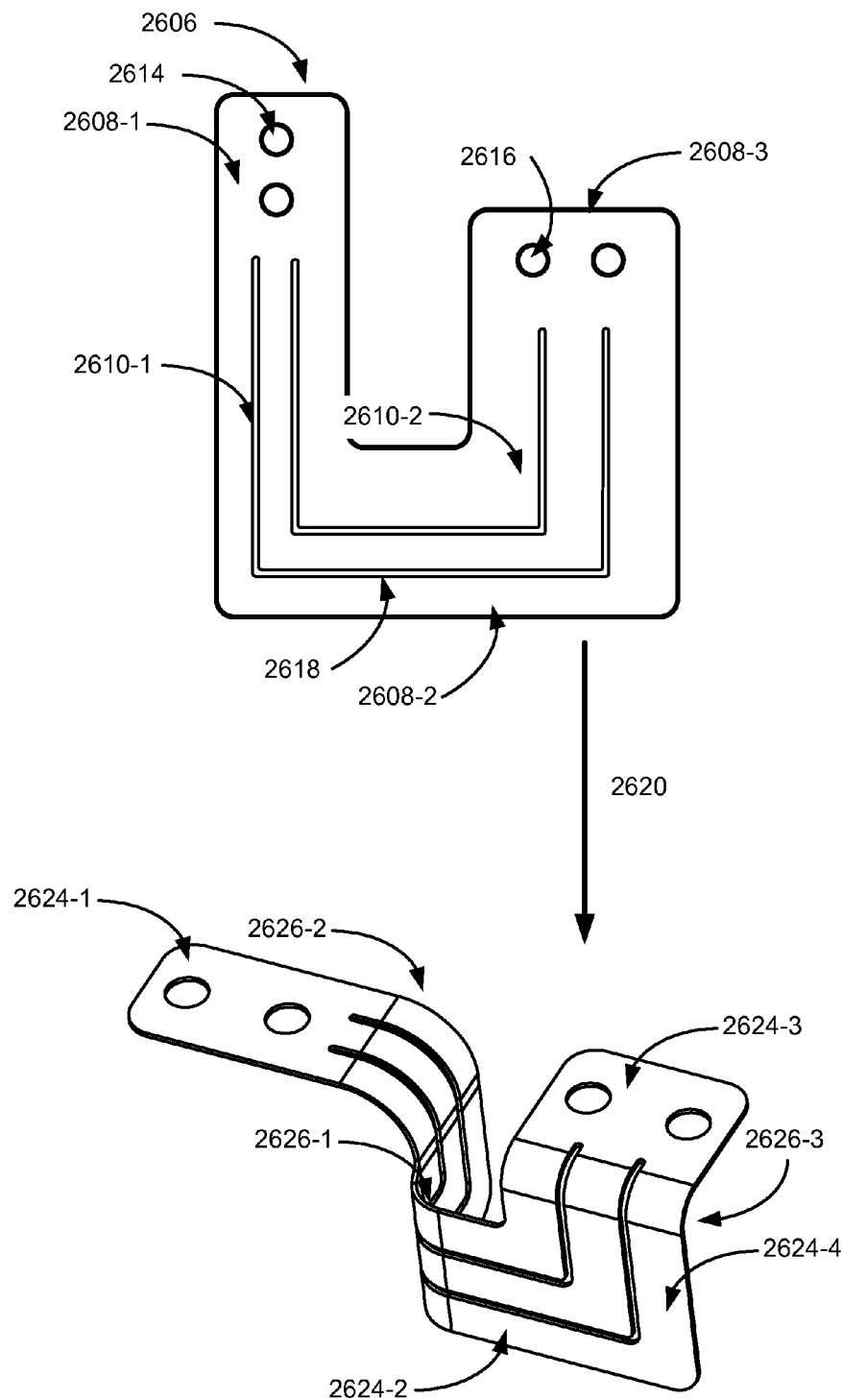

FIGS. 26A-26C illustrate a sheet metal process 2600 in accordance with some embodiments. In some embodiments, any of the battery cell connectors described herein (e.g., with reference to FIGS. 1-25) are manufactured (e.g., formed), or partially manufactured (e.g., in the case of a battery cell connector with "tweezers"), using sheet metal process 2600. For ease of explanation, sheet metal process is described herein as producing a battery cell connector analogous to battery cell connector 100, shown in FIG. 1.

The sheet metal process involves cutting (2602) a sheet of metal 2604 into a two-dimensional (e.g., planar) U-shape 2606 comprising a first plurality of planar segments 2608 (e.g., planar segments 2608-1 through 2608-3) separated by a plurality of turns 2610 (e.g., turn 2610-1 and 2610-2). For example, in some embodiments, the sheet of metal is a 1 millimeter (mm) or 2 mm copper sheet. In some embodiments, cutting the sheet of metal into the two-dimensional shape comprises blanking the sheet of metal. In some embodiments, the two-dimensional shape is substantially L-shaped or U-shaped. For example, two-dimensional shape 2606 is substantially U-shaped.

In some embodiments, sheet metal process 2600 includes cutting (2612) (e.g., punching, sawing, milling, nibbling, or drilling) additional features into the two-dimensional shape 2606. For example, in some embodiments, sheet metal process 2600 includes cutting, in a first segment 2608-1 of the plurality of segments 2608, one or more first connecting elements 2614 for a battery pole of a first battery cell. Sheet metal process 2600 also includes cutting, in a second segment 2608-3 of the plurality of segments, one or more second connecting elements 2616 for a battery pole of a second battery cell. In some embodiments, cutting the one or more first connecting elements and cutting the one or more second connecting elements comprises drilling or hole punching the one or more first connecting elements and the one or more second connecting elements. In some embodiments, the additional features include L-shaped or U-shaped cutouts 2618.

Sheet metal process 2600 includes bending 2620 the two-dimensional shape 2606 into a three-dimensional shape 2622 comprising a second plurality of planar segments 2624 (for visual clarity, only some of planar segments 2624 have been labeled in FIG. 26C). In some embodiments, the second plurality of planar segments 2624 having a greater number of segments than the first plurality of planar segments 2608 (e.g., the operation of bending creates additional planar segments—that is, when a planar segment is bent, in some circumstances, it creates two planar segments coupled by a bend). The three-dimensional shape includes a plurality of bends 2626 separating respective segments of the second plurality of planar segments and pointing to at least three different directions. In some embodiments, the three different directions are mutually orthogonal directions (e.g., the plurality of bends includes three bends with three different bending axes that are all mutually orthogonal to the other bending axes). In some embodiments, after bending, the first segment and the second segment are not parallel to each other.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first segment could be termed a second segment, and, similarly, a second segment could be termed a first segment, without changing the meaning of the description, so long as all occurrences of the "first segment" are renamed consistently and all occurrences of the "second segment" are renamed consistently. The first segment and the second segment are both segments, but they are not the same segment.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A battery cell connector, comprising:
    a plurality of segments of a metal conducting sheet, each segment defining a respective plane and having a respective longitudinal axis;
    a plurality of bends coupling the plurality of segments together into a 3-D object, each bend located between a unique pair of adjacent segments of the plurality of segments, wherein the unique pair of adjacent segments define two distinct respective planes; and
    at least one spring comprising two respective segments of the plurality of segments welded together;
    wherein:
        a first segment of the plurality of segments includes one or more first connecting elements for a battery pole of a first battery cell;
        a second segment of the plurality of segments includes one or more second connecting elements for a battery pole of a second battery cell; and
        the one or more first connecting elements are electrically coupled with the one or more second connecting elements.

2. The battery cell connector of claim 1, comprising at least two continuous sheets of metal, the at least two continuous sheets of metal coupled together by the welding of the two respective segments forming the spring.

3. The battery cell connector of claim 1, wherein the plurality of bends point to at least three different directions.

4. The battery cell connector of claim 1, wherein the first and second segments of the plurality of segments are not parallel to each other.

5. The battery cell connector of claim 1, further comprising a plurality of turns, each turn coupling a second unique pair of adjacent segments in the plurality of segments, wherein the second unique pair of adjacent segments have distinct respective longitudinal axis within the same respective plane.

6. The battery cell connector of claim 1, wherein the plurality of segments comprise an electrical conductor forming the electrical coupling between the one or more first connecting elements and the one or more second connecting elements.

7. The battery cell connector of claim 1, wherein the plurality of segments has an L-shaped opening.

8. The battery cell connector of claim 1, wherein the plurality of bends comprise vibration dampening elements.

9. The battery cell connector of claim 1, wherein the battery cell connector is for use in a vehicle and the plurality of bends are elastically deformable within a set of operating conditions of the vehicle.

10. The battery cell connector of claim 1, wherein the plurality of bends includes three bends.

11. The battery cell connector of claim 10, wherein the three bends have three distinct axes of bending.

12. The battery cell connector of claim 11, wherein the three distinct axes of bending are substantially perpendicular to one another.

13. The battery cell connector of claim 1, wherein the plurality of segments includes three segments.

14. The battery cell connector of claim 13, wherein the three segments define three distinct respective planes.

15. The battery cell connector of claim 14, wherein the three distinct respective planes are substantially perpendicular.

16. The battery cell connector of claim 1, wherein a respective connecting element of the first connecting elements and the second connecting elements comprises an opening adapted to receive a battery terminal, wherein the battery terminal is mechanically connected at least partially along a circumference of the opening.

17. The battery cell connector of claim 1, further including at least one vibration-absorbent bump formed in a respective segment of the plurality of segments.

* * * * *